United States Patent
Park et al.

(10) Patent No.: US 11,172,750 B2
(45) Date of Patent: Nov. 16, 2021

(54) HYDROGEL DISCHARGE DEVICE

(71) Applicant: LG ELECTRONICS INC., Seoul (KR)

(72) Inventors: Junsoo Park, Seoul (KR); Jiyeong Ku, Seoul (KR); Jeehoon Bong, Seoul (KR); Ri Seo, Seoul (KR); Inji Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 16/462,745

(22) PCT Filed: Sep. 21, 2017

(86) PCT No.: PCT/KR2017/010412
§ 371 (c)(1),
(2) Date: May 21, 2019

(87) PCT Pub. No.: WO2018/056722
PCT Pub. Date: Mar. 29, 2018

(65) Prior Publication Data
US 2019/0350344 A1    Nov. 21, 2019

(30) Foreign Application Priority Data

Sep. 22, 2016  (KR) .................. 10-2016-0121739
Sep. 22, 2016  (KR) .................. 10-2016-0121740

(51) Int. Cl.
*A45D 44/00*    (2006.01)
*A45D 44/22*    (2006.01)
(Continued)

(52) U.S. Cl.
CPC .......... *A45D 44/002* (2013.01); *A45D 44/22* (2013.01); *B29B 7/82* (2013.01); *B29C 64/112* (2017.08);
(Continued)

(58) Field of Classification Search
CPC .... A45D 44/002; B29C 64/106; B33Y 30/00; A61K 8/0212; B29L 2031/718
(Continued)

(56) References Cited

U.S. PATENT DOCUMENTS 5,785,960  A  *  7/1998  Rigg .................... A61B 5/444
                                              424/63
2001/0047309 A1*  11/2001  Bartholomew .... G06Q 30/0641
                                              700/233
(Continued)

FOREIGN PATENT DOCUMENTS

CN    104940113 A    9/2015
CN    104997645 A    10/2015
(Continued)

*Primary Examiner* — Timothy R Waggoner
(74) *Attorney, Agent, or Firm* — Birch, Stewart, Kolasch & Birch, LLP

(57) ABSTRACT

Disclosed is a hydrogel discharge device including a capsule introduction unit, into which a plurality of capsules each receiving a hydrogel dosage form is introduced, a dosage form transfer unit including a plurality of channels, along which the hydrogel dosage forms received in the capsules move, a dosage form spray unit for discharging the hydrogel dosage forms supplied from the dosage form transfer unit, and a dosage form solidification unit for solidifying the hydrogel dosage forms discharged from the dosage form spray unit, whereby it is possible to easily and conveniently manufacture a mask pack.

20 Claims, 30 Drawing Sheets

(51) Int. Cl.
B29C 64/314 (2017.01)
B29C 64/112 (2017.01)
B29C 64/295 (2017.01)
B29B 7/82 (2006.01)
B29L 31/00 (2006.01)

(52) U.S. Cl.
CPC .......... *B29C 64/295* (2017.08); *B29C 64/314* (2017.08); *B29L 2031/718* (2013.01)

(58) Field of Classification Search
USPC .......................................................... 700/233
See application file for complete search history.

(56) References Cited

U.S. PATENT DOCUMENTS

| | | | | |
|---|---|---|---|---|
| 2009/0280150 A1* | 11/2009 | Kamen | ................ | A45D 44/002 424/401 |
| 2010/0191314 A1* | 7/2010 | Young | ................... | A61F 7/0241 607/109 |
| 2013/0209600 A1* | 8/2013 | Tow | ....................... | B33Y 30/00 425/375 |
| 2017/0259599 A1* | 9/2017 | Shinoda | .............. | B41F 33/0027 |
| 2017/0340090 A1* | 11/2017 | Kim | ..................... | D01D 5/0023 |
| 2020/0316858 A1* | 10/2020 | Seo | ........................ | A61Q 19/00 |
| 2020/0317542 A1* | 10/2020 | Dijkstra | ................ | C02F 1/4618 |

FOREIGN PATENT DOCUMENTS

| | | |
|---|---|---|
| KR | 20-0443115 Y1 | 1/2009 |
| KR | 10-1342925 B1 | 12/2013 |
| KR | 10-2014-0107019 A | 9/2014 |
| KR | 10-1556078 B1 | 9/2015 |
| KR | 10-1561476 B1 | 10/2015 |

\* cited by examiner

FIG. 15

| TEMPERATURE | -4 DEGREES OR LESS | -4 TO 3 DEGREES | 5 TO 15 DEGREES | ROOM TEMPERATURE | 55 DEGREES | 70 TO 75 DEGREES | 80 DEGREES |
|---|---|---|---|---|---|---|---|
| PHASE | SOLID | SOLID | SOLID | SOLID | SOLID TO LIQUID | LIQUID | LIQUID |
| CHARACTERISTICS BASED ON TEMPERATURE | GEL COMPONENT CONTAINS INGREDIENTS AND MOISTURIZING WATER, WHEREBY LITTLE WATER RELEASE PHENOMENON OCCURS. IF TEMPERATURE IS TOO LOW, GEL MAY FREEZE. | SOLIDIFICATION TEMPERATURE IN MANUFACTURING PROCESS. WHEN TEMPERATURE OF COOLING CHAMBER IS SET TO -3 TO 0 DEGREES, RAPID GELATION OCCURS IN COOLING CHAMBER IN TEMPERATURE RANGE OF ABOUT 0 TO 3 DEGREES. | WHEN PLACED AT TEMPERATURE LOWER THAN ROOM TEMPERATURE, WATER RELEASE PHENOMENON MAY OCCUR. | WATER RELEASE PHENOMENON OCCURS AT ROOM TEMPERATURE. FOR THIS REASON, HYDROGEL PACK IS WET AND MOIST WHEN HYDROGEL PACK IS USED WITHOUT SPRAYING ADDITIONAL ESSENCE. | SOLID GEL STARTS TO BE CONVERTED INTO LIQUID GEL AT TEMPERATURE EQUAL TO OR HIGHER THAN 55 DEGREES. IT IS NECESSARY TO MAINTAIN TEMPERATURE HIGHER THAN 55 DEGREES IN ORDER TO MAINTAIN GEL IN LIQUID STATE. | LIQUEFACTION TEMPERATURE IN MANUFACTURING PROCESS. VISCOSITY OF GEL AT 70 DEGREES IS 5000 TO 7000 CPs. | VISCOSITY DECREASES (FLUIDITY INCREASES) AS TEMPERATURE INCREASES. IF FLUIDITY IS EXCESSIVE, HOWEVER, COOLING MAY BE IMPOSSIBLE + MOISTURE MAY EVAPORATE FROM GEL. |

FIG. 22

| CLASSIFICATION | PNEUMATIC PRESSURE DIRECTION | PNEUMATIC PRESSURE INTENSITY | INTENSITY DESCRIPTION | REMARKS |
|---|---|---|---|---|
| 1 | POSITIVE PRESSURE (GRAVITY DIRECTION) | +2 | INTENSITY TO CONTROL MINIMUM FLUIDITY OF DOSAGE FORM | |
| 2 | POSITIVE PRESSURE (GRAVITY DIRECTION) | +1 | 1/2 SCALAR VALUE OF PNEUMATIC PRESSURE (1) | BASIC POSITIVE PRESSURE |
| 3 | - | 0 | NO PNEUMATIC PRESSURE APPLIED | |
| 4 | NEGATIVE PRESSURE (OPPOSITE GRAVITY DIRECTION) | -1 | INTENSITY TO HOLD AVERAGE FLUIDITY OF DOSAGE FORM | BASIC POSITIVE PRESSURE |
| 5 | NEGATIVE PRESSURE (OPPOSITE GRAVITY DIRECTION) | -2 | INTENSITY TO HOLD MAXIMUM FLUIDITY OF DOSAGE FORM | |

HYDROGEL DISCHARGE DEVICE

CROSS REFERENCE TO RELATED APPLICATIONS

This application is the National Phase of PCT International Application No. PCT/KR2017/010412, filed on Sep. 21, 2017, which claims priority under 35 U.S.C. 119(a) to Patent Application No. 10-2016-0121739, filed in the Republic of Korea on Sep. 22, 2016, and to Patent Application No. 10-2016-0121740, filed in the Republic of Korea on Sep. 22, 2016, all of which are hereby expressly incorporated by reference into the present application.

TECHNICAL FIELD

The present invention relates to a hydrogel discharge device and a method of operating the same, and more particularly to a hydrogel discharge device capable of discharging hydrogel to manufacture a mask pack and a method of operating the same.

BACKGROUND ART

Interest in skin care has continually risen, and people have come to habitually invest great time and expense in skin care.

In particular, with the increase in female participation in economic activities, female expense for skin care cosmetics, skin care service, and skin care equipment has increased. In addition, male interest in skin care has also increased in recent years.

In addition, the current mask pack market has grown to a level similar to the level of a single small-sized electric home appliance market, and is expected to continue to grow in the future.

A KOTRA industrial trend report (2015.09) reveals that the Korean mask pack market size in 2015 is 4 billion won and that the Chinese mask pack market size in 2015 is 4.4 trillion won.

Meanwhile, using special skin care shops is burdensome in terms of time, sanitation, and expense. For this reason, interest in individual skin care equipment has increased.

Consequently, the conventional cosmetics industry is said to have matured, whereas the individual skin care equipment market is rapidly expanding.

As a result, the demand for a DIY-type special mask pack manufacturing device that enables a user to manufacture a mask pack depending on the skin type and condition of the user has increased.

In addition, research has been increasingly conducted on equipment and service capable of mixing various raw materials, coloring materials, perfumes, etc. to immediately manufacture and sell cosmetics in shops in response to the demand of customers according to the introduction of systems for selling "customized cosmetics" in shops.

DISCLOSURE

Technical Problem

It is an object of the present invention to provide a hydrogel discharge device capable of discharging hydrogel to manufacture a mask pack and a method of operating the same.

It is another object of the present invention to provide a hydrogel discharge device capable of mixing various ingredients to manufacture a customized mask pack that is optimized for an individual and a method of operating the same.

It is another object of the present invention to provide a hydrogel discharge device that enables skin to be conveniently and easily cared for in a shop or at home and a method of operating the same.

It is another object of the present invention to provide a hydrogel discharge device capable of efficiently managing heat, the state of dosage forms, and the movement of the dosage forms therein and a method of operating the same.

It is a further object of the present invention to provide a hydrogel discharge device capable of being operatively connected to another electronic device to more efficiently manufacture a mask pack and a method of operating the same.

Technical Solution

In accordance with an aspect of the present invention, the above and other objects can be accomplished by the provision of a hydrogel discharge device including a capsule introduction unit, into which a plurality of capsules each receiving a hydrogel dosage form is introduced, a dosage form transfer unit including a plurality of channels, along which the hydrogel dosage forms received in the capsules move, a dosage form spray unit for discharging the hydrogel dosage forms supplied from the dosage form transfer unit, and a dosage form solidification unit for solidifying the hydrogel dosage forms discharged from the dosage form spray unit, whereby it is possible to easily and conveniently manufacture a mask pack.

Advantageous Effects

According to at least one of the embodiments of the present invention, it is possible to provide a hydrogel discharge device capable of discharging hydrogel to manufacture a mask pack and a method of operating the same.

In addition, according to at least one of the embodiments of the present invention, it is possible to mix various ingredients in order to manufacture a customized mask pack that is optimized for an individual.

In addition, according to at least one of the embodiments of the present invention, it is possible to conveniently and easily care for skin in a shop or at home.

In addition, according to at least one of the embodiments of the present invention, it is possible to more efficiently manufacture a mask pack through operative connection with another electronic device.

In addition, according to at least one of the embodiments of the present invention, it is possible to efficiently manage heat, the state of dosage forms, and the movement of the dosage forms in the device and to manufacture a mask pack at a faster speed.

Meanwhile, various other effects will be directly or implicitly disclosed in the following detailed description of embodiments of the present invention.

DESCRIPTION OF DRAWINGS

FIGS. 13 to 15 are reference views illustrating hydrogel.

FIG. 22 is a reference view illustrating the classification of pneumatic pressure according to an embodiment of the present invention.

DETAILED DESCRIPTION OF THE EMBODIMENTS

Hereinafter, embodiments of the present invention will be described with reference to the accompanying drawings. However, the present invention is not limited to the following embodiments, but may be implemented in various different forms.

Parts that are not related to the description of the present invention will be omitted from the drawings in order to clearly and briefly describe the present invention. Wherever possible, the same reference numbers will be used throughout the specification to refer to the same or like elements.

Meanwhile, the terms "module" and "unit," when attached to the names of components, are used herein merely for convenience of description, and thus they should not be considered as having specific meanings or roles. Accordingly, the terms "module" and "unit" may be used interchangeably.

Figure 1:
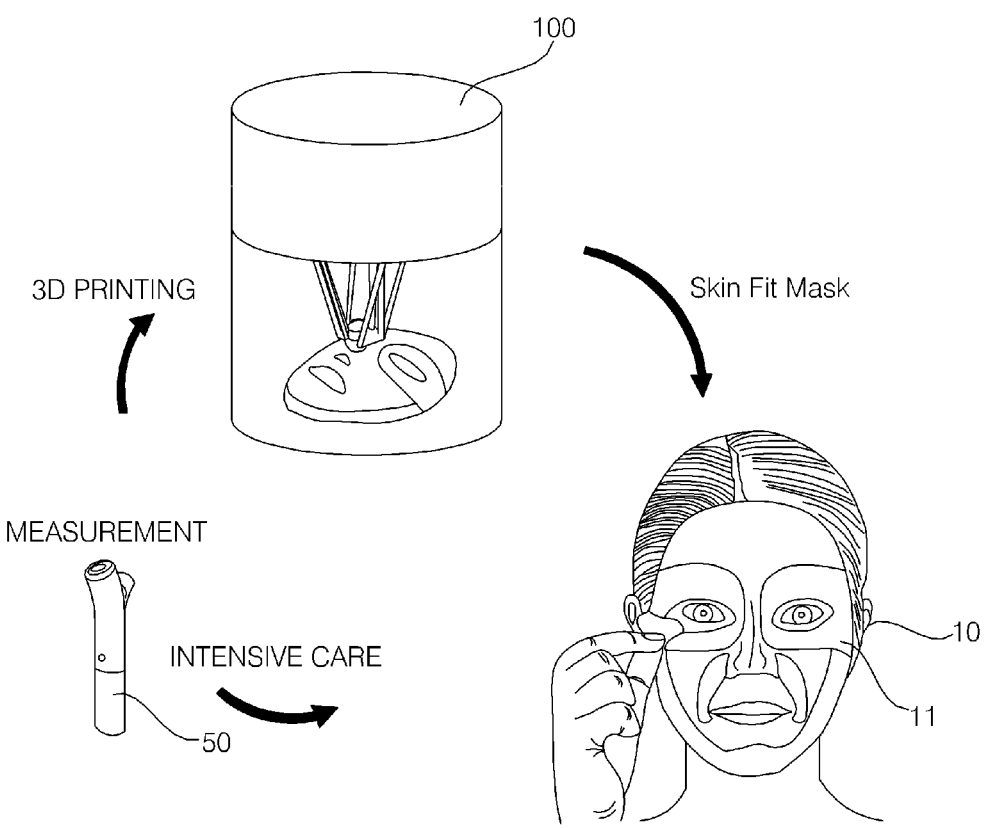
FIG. 1 is a reference view illustrating a beauty system including a hydrogel discharge device according to an embodiment of the present invention.

FIG. 1 is a reference view illustrating a beauty system including a hydrogel discharge device according to an embodiment of the present invention.

FIGS. 2a to 2e are reference views illustrating skin beauty service provided through the beauty system including the hydrogel discharge device according to the embodiment of the present invention, wherein skin beauty service provided in a shop provided with the hydrogel discharge device 100 is illustrated.

Figure 3:
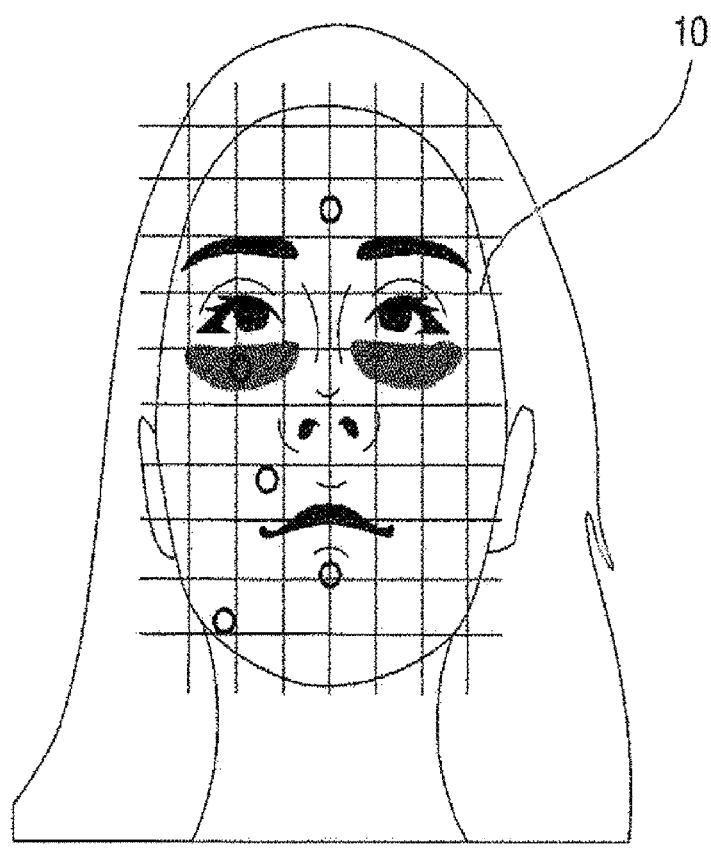
FIG. 3 is a reference view illustrating skin state measurement according to an embodiment of the present invention.

FIG. 3 is a reference view illustrating skin state measurement according to an embodiment of the present invention.

Figure 2A:
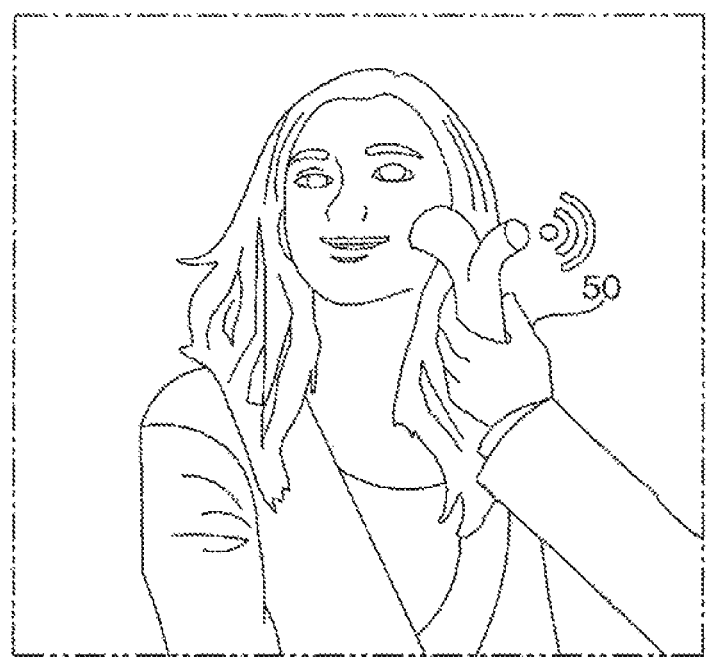
FIGS. 2a to 2e are reference views illustrating skin beauty service provided through the beauty system including the hydrogel discharge device according to the embodiment of the present invention.

Referring to FIGS. 1 and 2a, the face skin state of a user may be measured using a skin measurement device 50 or an electronic device that provides the same function.

The skin measurement device 50, which is a dedicated measurement device, may measure the face state of the user to acquire quantitative information, and may transmit the quantitative information to the hydrogel discharge device 100 and/or a predetermined electronic device. For example, as shown in FIG. 3, the skin measurement device 50 may measure the face skin state of the user for five respective regions of a face 10, such as a T zone, eye rims, nasolabial fold portions, the sides of the mouth, and a U zone, and may generate skin state information based on the measurement results.

In addition, the hydrogel discharge device 100 according to the embodiment of the present invention may receive the measured skin state information of the user's face 10 from the skin measurement device 50.

The face skin state information of the user may include at least one piece of information selected from among the size and shape of the user's face 10, result data measured for respective sensing items and respective facial regions, and skin state classification determined based on measured numerical values.

Here, the user may be a person who uses the hydrogel discharge device 100 at home or a person who receives skin care service in a shop provided with the hydrogel discharge device 100.

Meanwhile, in some embodiments, the skin measurement device 50 may capture an image of the face of the user using a camera module provided therein to acquire image data, and may transmit the image data to the hydrogel discharge device 100 and/or a predetermined electronic device.

Referring to FIG. 3, the user or a sales clerk may sequentially measure the five regions of the face 10 of the user, such as the T zone, the eye rims, the nasolabial fold portions, the sides of the mouth, and the U zone, using the skin measurement device 50.

The user or the sales clerk may make the skin measurement device 50 contact a total of 5 regions, such as the T zone (the forehead; once), the eye rims, the nasolabial fold portions, the U zone (the left; once), and the sides of the mouth (the portion below the lips; once) a total of 5 times to measure the skin state of the user.

In addition, the user or the sales clerk may capture an image of the face of the user using a dedicated camera or a camera provided in the skin measurement device 50, and may measure the size of the face of the user based on vision recognition technology.

For example, the skin measurement device 50 may measure the skin state of the user using a speckle-technology-based contact-type skin state measurement method, and may measure 3D facial contours based on vision recognition technology.

The speckle-technology-based contact-type skin state measurement method, which is technology of capturing a speckle pattern caused by the optical interference phenomenon of a laser to analyze a skin surface state, may measure a total 7 factors, such as wrinkles, pores, freckles, tones, oiliness, moisture, and elasticity. The speckle-technology-based contact-type skin state measurement method is more effective than other skin state measurement methods in that it is possible to measure elasticity.

Meanwhile, the skin measurement device 50 may transmit measurement values to the hydrogel discharge device 100 and another device over a wireless network, such as Bluetooth or Wi-Fi.

In addition, the skin measurement device 50 may sort skin states determined based on the measured numerical values, and may map the same with a solution.

Alternatively, the hydrogel discharge device 100 may determine skin states based on the received skin state information, and may map the same with a solution.

For example, upon determining that dryness of the measured skin is serious, the skin measurement device 50 or the hydrogel discharge device 100 may set a moisturizing capsule for receiving a moisturizing-ingredient-reinforced material as a solution.

In addition, in the case in which the size value of the face is determined, the skin measurement device 50 or the hydrogel discharge device 100 may divide the face into five equal regions, and may map each region with a solution.

For example, upon determining that insufficiency of moisture in the T zone is serious, the skin measurement device 50 or the hydrogel discharge device 100 may set a moisturizing capsule as a solution for the T zone.

Meanwhile, the skin measurement device 50 or the hydrogel discharge device 100 may provide a solution pertaining to the measurement result through visual/vocal feedback, such as a message "introduce three moisturizing capsules, one elasticity capsule, and one wrinkle treatment capsule."

For example, visual feedback may be provided through a display provided in the skin measurement device 50, the hydrogel discharge device 100, or a user's smartphone, or vocal feedback may be provided through a speaker provided therein.

Figure 2B:
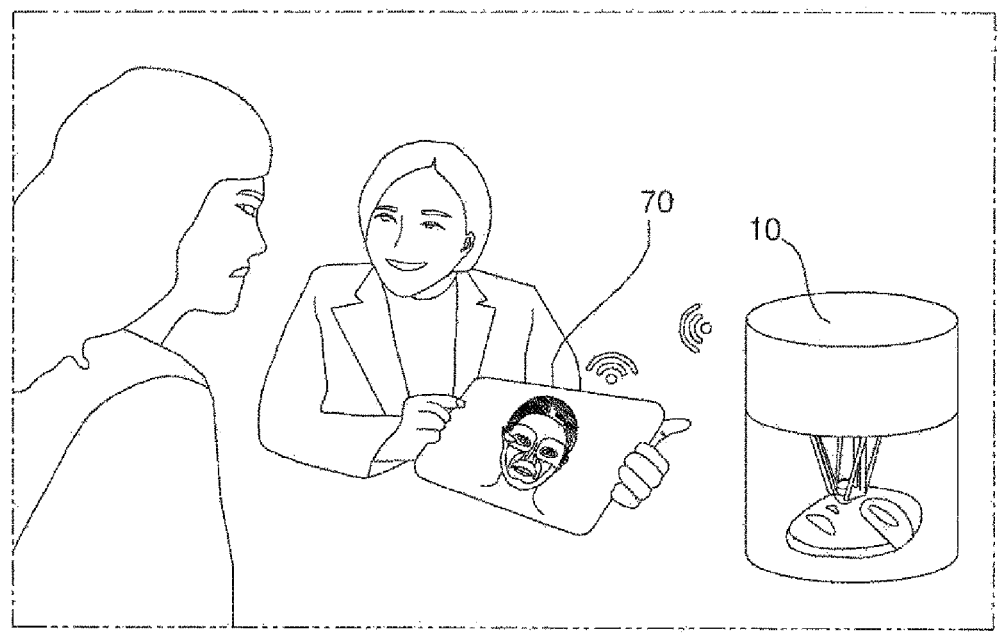

Meanwhile, referring to FIG. 2*b*, in a shop, state diagnosis and consultation pertaining to the size, shape, and skin type of the user' face may be performed based on the skin state information of the user's face 10 measured by the skin measurement device 50.

The skin measurement device 50 may directly transmit skin state information to a predetermined electronic device, such as a tablet PC 70, or may upload the same in a predetermined server.

In this case, the predetermined electronic device, such as the tablet PC 70, may use the skin state information measured by the skin measurement device 50.

Consequently, a customer who uses service in a shop may immediately confirm measurement results and a solution customized for the customer.

In addition, when necessary, the customer may receive the measurement information through an individual smartphone of the customer.

Consequently, the beauty system including the hydrogel discharge device 100 according to the embodiment of the present invention is capable of measuring the skin state of principal regions of the user's face 10 using the skin measurement device 50 and providing real-time individually customized care through scientifically measured skin state information.

Figure 2C:
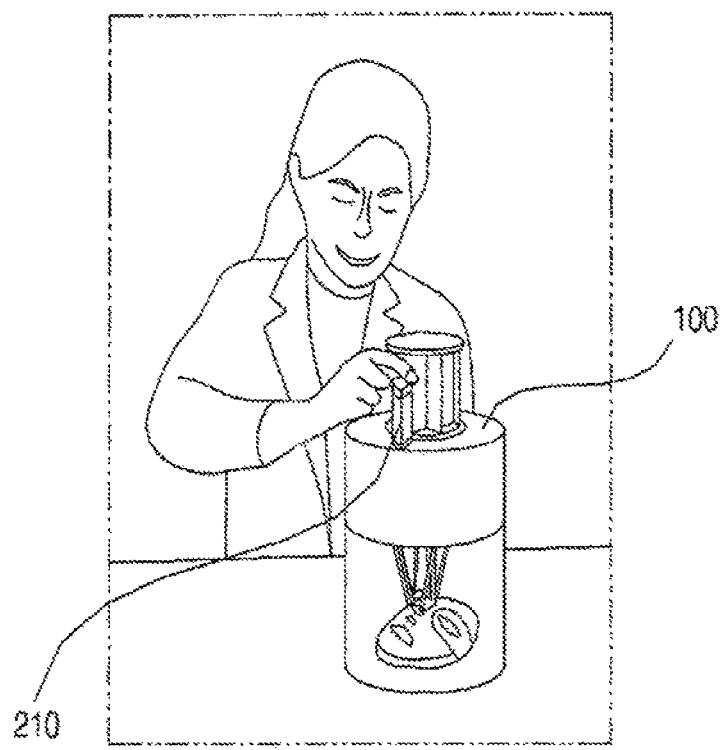

Referring to FIG. 2*c*, a plurality of capsules 210 each containing various ingredients may be introduced into the hydrogel discharge device 100 according to the embodiment of the present invention, and the ingredients in the capsules 210 may be mixed to manufacture a mask pack 11.

For example, a user at home or a sales clerk may introduce customized capsules for moisturizing, elasticity increase (anti-wrinkles), nourishment, whitening, and trouble alleviation into the hydrogel discharge device 100 depending on the skin type and/or the skin state of the user on that day to manufacture a mask pack 11.

Consequently, the hydrogel discharge device 100 according to the embodiment of the present invention may be a premium beauty device capable of performing face measurement and providing a solution suitable for each skin region using a 3D printer.

The 3D printer, which is a device for manufacturing a three-dimensional article based on three-dimensional drawing data, is mainly classified as a stacking-type printer or a cutting-type printer. The stacking-type printer is of a type in which a predetermined material is sprayed to stack a plurality of layers each having a minute thickness, and the cutting-type printer is of a type in which a material is cut to manufacture an article. In the case in which the cutting-type printer is used, material loss occurs. For this reason, the stacking-type printer tends to be used more frequently.

In this specification, a description is given based on a stacking-type method, although the present invention is not limited to a 3D printing method.

The hydrogel discharge device 100 according to the embodiment of the present invention may be a kind of 3D printer capable of receiving skin state information and manufacturing a mask pack 11 optimized for the skin state information using hydrogel.

Meanwhile, the hydrogel discharge device 100 according to the embodiment of the present invention may manufacture a mask pack 11 using a dosage form customized for each region depending on the measured face skin state information of the user.

For example, when the skin measurement device 50 transmits the skin state information of the five regions, such as the T zone, the eye rims, the nasolabial fold portions, the sides of the mouth, and the U zone, to the hydrogel discharge device 100, the hydrogel discharge device 100 may mix ingredients customized for the respective regions based on the received skin state information with each other to manufacture a mask pack 11.

Capsules containing hydrogel dosage forms having various ingredients may be introduced into the hydrogel discharge device 100, and the hydrogel discharge device 100 may adjust the ingredients contained in the respective capsules and the mixing concentration thereof to manufacture a gel-type mask pack.

Consequently, it is possible to optimize the size of an individual mask pack and to select a facial region and ingredient mixing concentration.

In addition, functional customized capsules for moisturizing, anti-wrinkles, nourishment, and trouble alleviation may be introduced depending on the skin state on that day to manufacture a mask pack, whereby it is possible to manufacture a gel-type mask pack in which ingredients optimized for respective facial regions depending on the skin state on that day are mixed with each other.

Consequently, the beauty system including the hydrogel discharge device 100 according to the embodiment of the present invention is capable of providing an all-in-one esthetic solution, which does not require the purchase or use of additional cosmetics for specific regions, to the user.

In addition, the beauty system including the hydrogel discharge device 100 according to the embodiment of the present invention is capable of manufacturing a mask pack 11 using ingredients suitable for the state of the user's skin and the respective regions thereof and thus providing a user experience in which the user feels the effects in which the optimized ingredients are rapidly absorbed into the skin, thereby feeling better effects than when visiting a special skin care shop.

Consequently, the beauty system including the hydrogel discharge device 100 according to the embodiment of the present invention is capable of satisfying the demand of a user who wishes a customized product and service and manufacturing a mask pack such that a customer can experience the manufacturing process, rather than simply through an industrial process for controlling hydrogel, thereby improving the emotional quality experienced by the consumer (user).

Figure 2D:
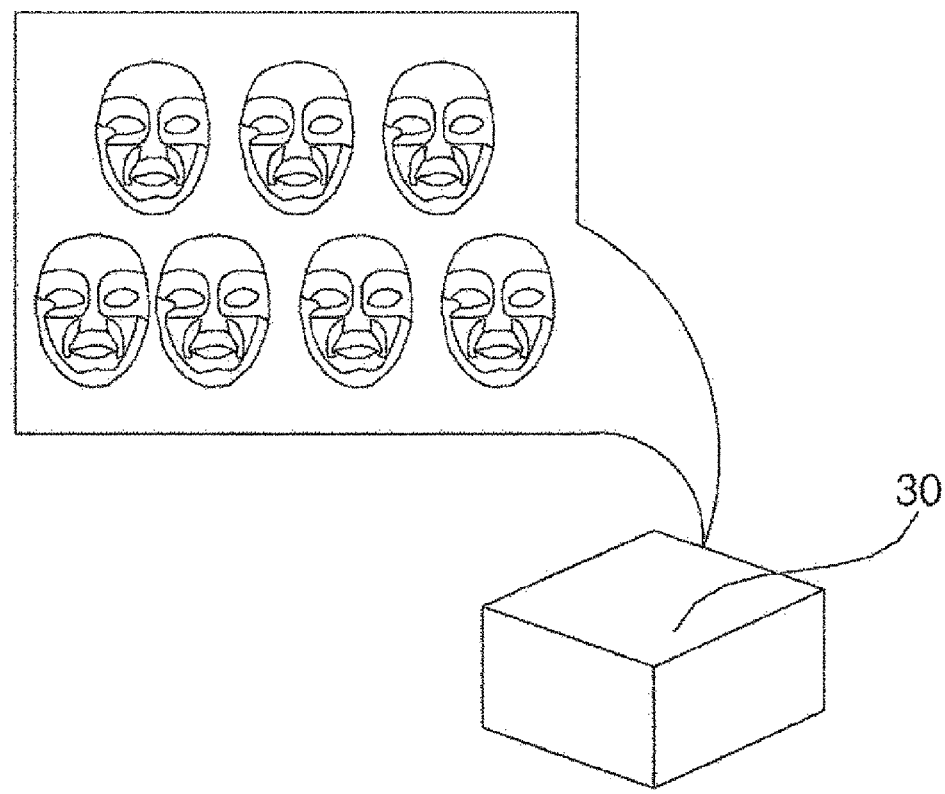
Figure 2E:
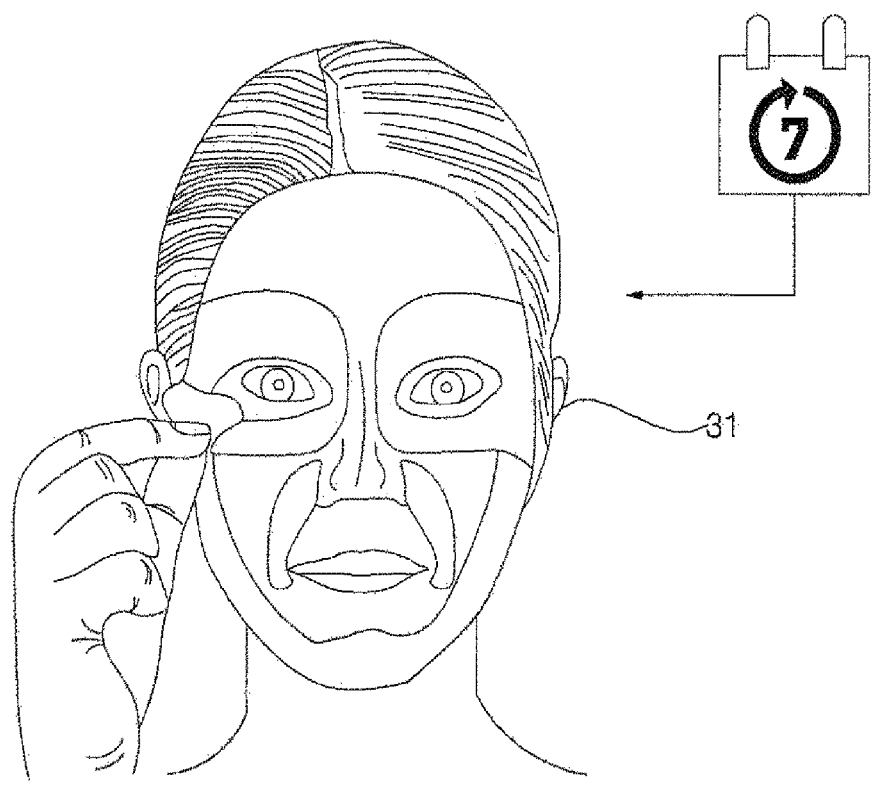

Meanwhile, referring to FIGS. 2d and 2e, in the shop, a plurality of mask packs may be manufactured and provided in the form of a care package pack 30.

For example, a user who receives a weekly care package pack 30 may receive customized care using mask packs 31 in the package pack during the week, and may again visit the shop in order to manufacture new mask packs depending on the latest skin state information.

Hereinafter, the hydrogel discharge device 100 according to the embodiment of the present invention will be described in detail with reference to the drawings.

Figure 4:
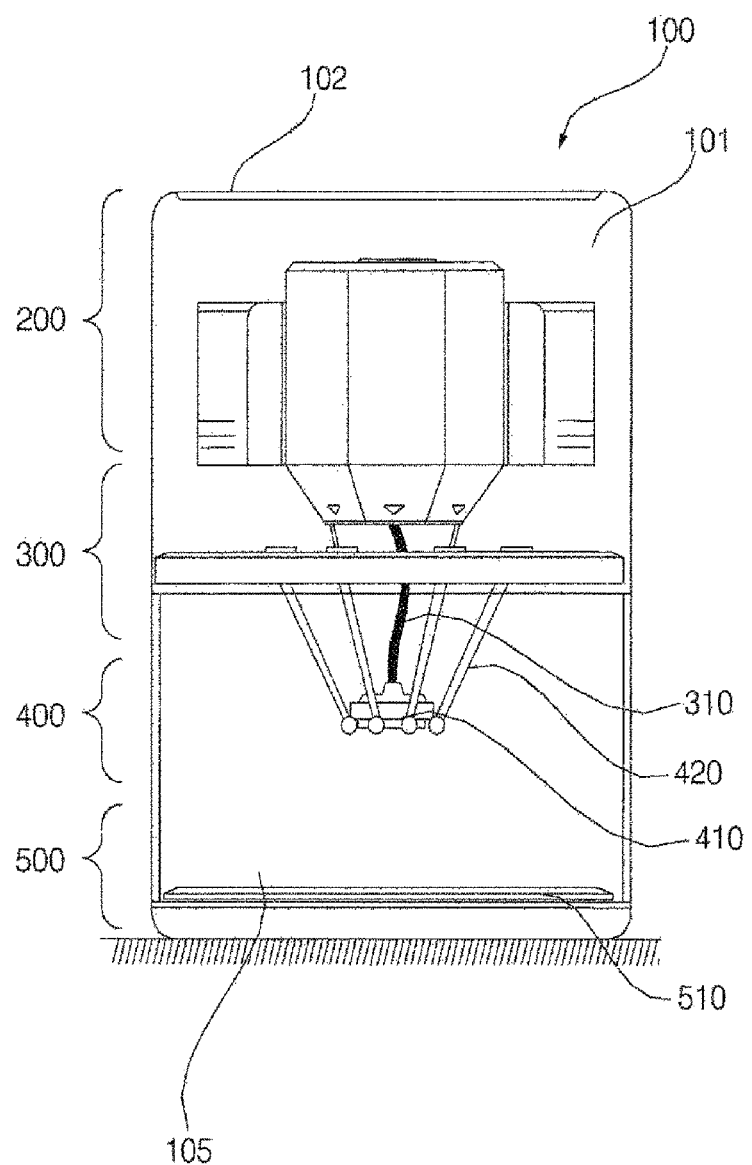
FIGS. 4 to 6 are conceptual views showing the hydrogel discharge device according to the embodiment of the present invention.
Figure 5:
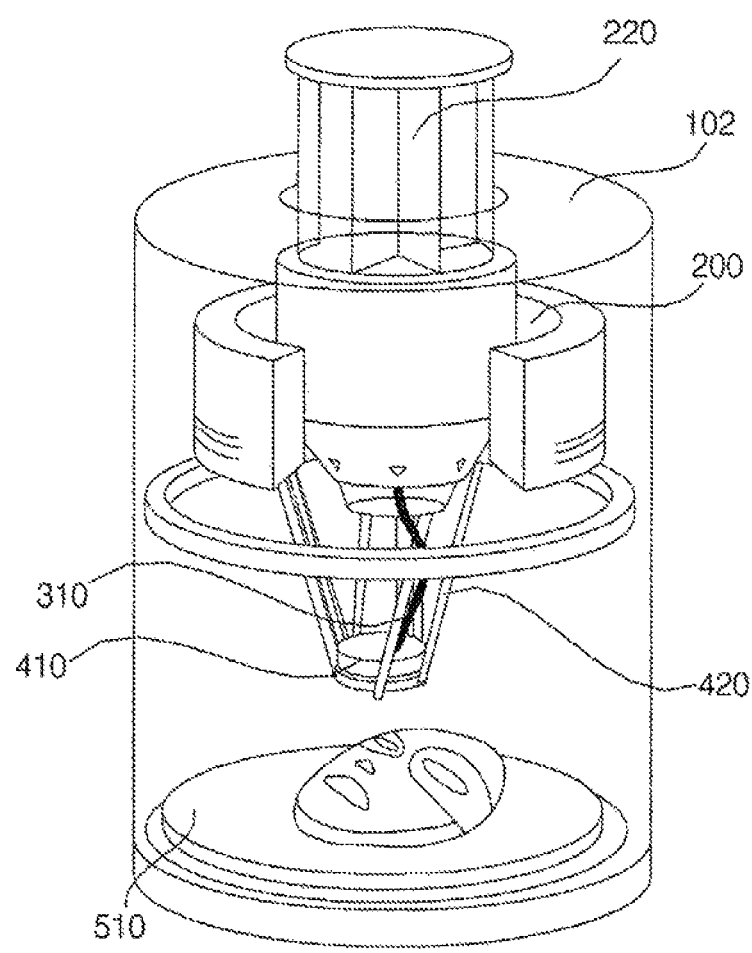
Figure 6:
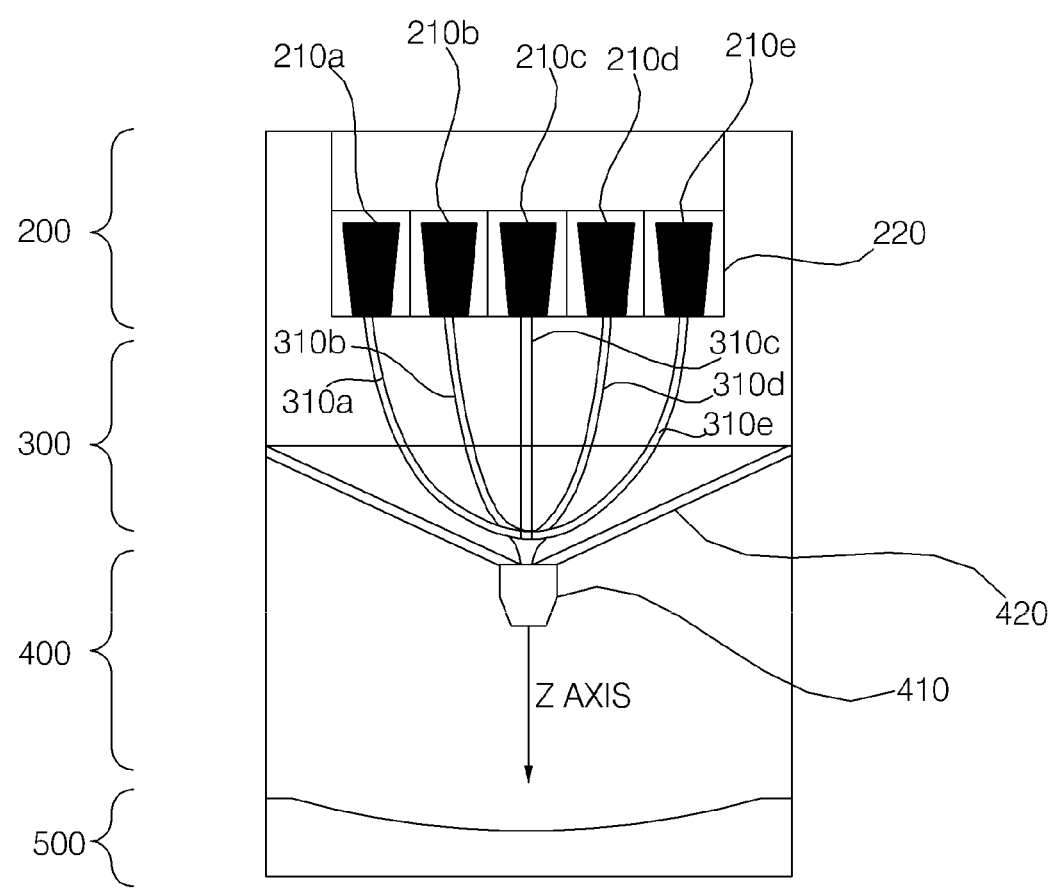
Figure 7:
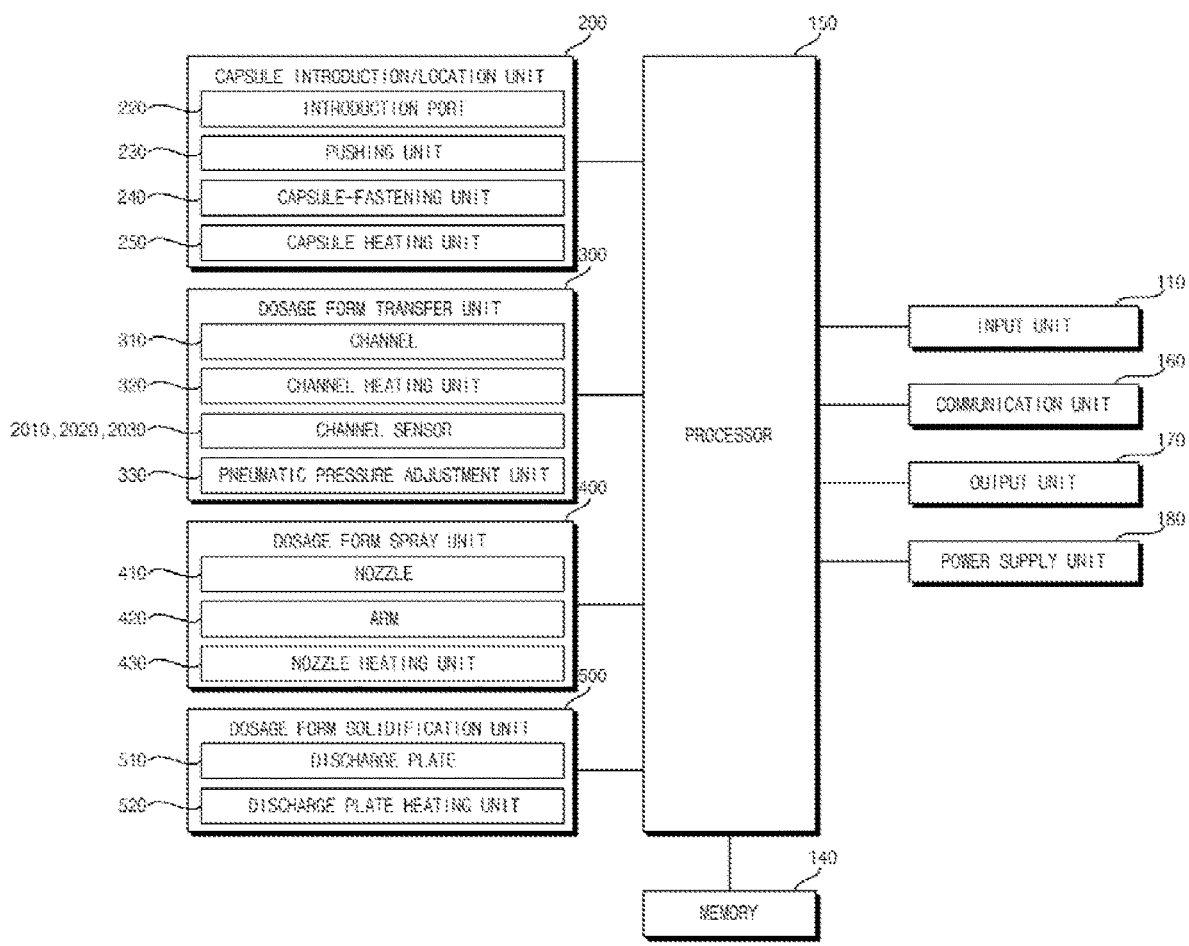
FIG. 7 is a block diagram showing the hydrogel discharge device according to the embodiment of the present invention.

FIGS. 4 to 6 are conceptual views showing the hydrogel discharge device according to the embodiment of the present invention, and FIG. 7 is a block diagram showing the hydrogel discharge device according to the embodiment of the present invention.

Referring to FIGS. 4 to 7, the hydrogel discharge device 100 according to the embodiment of the present invention may include a capsule introduction unit 200, into which a plurality of capsules each receiving a hydrogel dosage form is introduced, a dosage form transfer unit 300 including a plurality of channels 310, along which the hydrogel dosage forms received in the capsules move, a dosage form spray unit 400 for discharging the hydrogel dosage forms supplied from the dosage form transfer unit 300, and a dosage form solidification unit 500 for solidifying the hydrogel dosage forms discharged from the dosage form spray unit 400.

In addition, the hydrogel discharge device 100 according to the embodiment of the present invention may include a case 101, which defines the external appearance thereof, and the capsule introduction unit 200, the dosage form transfer unit 300, the dosage form spray unit 400, the dosage form solidification unit 500, and other parts may be disposed in the case 101.

In addition, a cavity, which is a space into which the hydrogel dosage forms are discharged to form a mask pack, may be defined in the case 101.

Meanwhile, at least a portion 105 of the case 101 may be made of a transparent material, such as glass, such that the interior of the cavity is visible.

For example, the case 101 may be divided into an upper opaque region and a lower transparent region.

In this case, the capsule introduction unit 200 may be disposed so as to correspond to the opaque region of the case 101, and the dosage form solidification unit 500 may be disposed so as to correspond to the transparent region of the case 101.

In addition, a portion of each of the dosage form transfer unit 300 and the dosage form spray unit 400 may be disposed so as to correspond to the opaque region of the case 101, and the remaining portion of each of the dosage form transfer unit 300 and the dosage form spray unit 400 may be disposed so as to correspond to the transparent region of the case 101.

In addition, the entirety of the transparent region 105 may be formed as a door capable of being opened and closed, or a portion of the transparent region 105 may be formed as a door such that the manufactured mask pack is easily removed. Alternatively, an opening, through which the manufactured mask pack is removed, may be formed in the transparent region 105.

Meanwhile, a plurality of capsules each receiving a hydrogel dosage form constituting the material for a mask pack may be introduced into and located in the capsule introduction unit 200. Consequently, the capsule introduction unit 200 may also be referred to as a capsule location unit or a capsule introduction/location unit.

The capsules may receive various ingredients used to manufacture a mask pack. Preferably, the respective capsules receive different ingredients.

In addition, the capsule introduction unit 200 may be provided with a plurality of introduction ports 220, through which the capsules are introduced and located. The number, size, and shape of the introduction ports 220 may be changed depending on the number, size, and shape of the capsules.

For example, in the case in which seven dosage capsules are used to manufacture seven mask packs, the height and size of the capsule introduction unit 200 and the height and size of the introduction ports 200 may be set in order to secure sufficient space to receive the seven dosage capsules in consideration of the height of the capsules.

In addition, the capsule introduction unit 200 may include a plurality of introduction ports 220, and the introduction ports may correspond to the channels in a one-to-one manner.

In the case in which five capsules are introduced to manufacture a mask pack, five introduction ports 220 may be provided. In the case in which six capsules are introduced to manufacture a mask pack, six introduction ports 220 may be provided.

The number of channels 310 may also be equal to the number of introduction ports 220 of the capsule introduction unit 200, and the channels 310 may correspond to the respective introduction ports 220 of the capsule introduction unit 200, through which the capsules are introduced.

FIG. 6 shows an example in which five exclusive channels 310a, 310b, 310c, 310d, and 310e are connected to five capsules 210a, 210b, 210c, 210d, and 201e, respectively.

Meanwhile, although the channels 310 are briefly shown in FIGS. 4 and 5, the channels 310 may be realized in the form in which the channels 310a, 310b, 310c, 310d, and 310e are coupled to each other. Alternatively, as shown in FIG. 6, the channels 310a, 310b, 310c, 310d, and 310e may be realized so as not contact each other along a considerable portion of the length thereof.

It is more effective to provide the introduction ports 220 and the channels 310 so as to correspond to the respective capsules in terms of sanitation and management.

Meanwhile, each of the introduction ports 220 may be configured to have a lateral introduction structure. More preferably, however, each of the introduction ports 220 is configured to have an upper vertical introduction structure in order to achieve easy discharge and to prevent the accumulation of liquid.

The hydrogel discharge device 100 may be designed such that the cavity, in which a mask pack is manufactured, is sufficiently secured, in addition to the height and size of the capsule introduction unit 200.

In addition, in consideration of the fact that the hydrogel discharge device 100 is installed and used on a display stand in a shop or on a dressing table at home, the height of the display stand or the dressing table may also be considered.

For example, the height of the hydrogel discharge device 100 may be designed such that the sum of the height of a general display stand or dressing table and the height of the hydrogel discharge device 100 is smaller than the average height of women, whereby it is possible for a user to easily introduce and recognize capsules.

Meanwhile, an upper plate 102 of the case 101 may be formed so as to be opened and closed in order to introduce capsules, or at least a portion of the capsule introduction unit 200 may protrude.

Meanwhile, the capsule introduction unit 200 may include a capsule heating unit 250 for heating the hydrogel dosage forms received in the capsules to liquefy the hydrogel dosage forms and a pushing unit for moving the liquefied hydrogel dosage forms to the dosage form transfer unit 300. Consequently, the dosage forms received in the capsules may be liquefied and moved.

For example, the capsule heating unit 250 of the capsule introduction unit 200 may include a heat source constituted by one or more hot wires, and the hot wires may be disposed so as to correspond to the respective introduction ports.

The capsule introduction unit 200 may drive the hot wires to liquefy the hydrogel dosage forms received in one or more of the introduced capsules.

The capsule introduction unit 200 may heat the lower parts of the capsules at about 60 degrees using the hot-wire-type heating unit 251 to liquefy the hydrogel dosage forms, and may push the capsules so as to push the dosage forms to the outside.

Meanwhile, the capsule introduction unit 200 may sense whether the capsules are correctly located, and may inform the user of the result of sensing through an output unit 170.

In addition, in some embodiments, the capsule introduction unit 200 may be configured to automatically recognize the kind of the introduced capsules.

Meanwhile, the dosage form transfer unit 300 may include a channel heating unit 320 for heating the channels 310 and a pneumatic pressure adjustment unit 330 for adjusting the pneumatic pressure in the channels 310.

For example, the channel heating unit 320 of the dosage form transfer unit 300 may include a heat source constituted by one or more hot wires 321, and the hot wires 321 may be disposed so as to correspond to the respective channels 310*a*, 310*b*, 310*c*, 310*d*, and 310*e*.

The dosage form transfer unit 300 may drive the hot wires 320 to maintain the temperature in the channels 310 at about 60 to 66 degrees such that the liquefied dosage forms are moved while the viscosity and liquid state thereof are maintained.

The pneumatic pressure adjustment unit 330 of the dosage form transfer unit 300 may adjust the pneumatic pressure in the channels 310, and may pump the channels 310 at a high pressure when necessary. To this end, the pneumatic pressure adjustment unit 330 may include a pump unit 331, and the pneumatic pressure in the channels 310 may be adjusted through pumping of the pump unit 331.

The dosage form spray unit 400 may include a nozzle 410 for discharging the hydrogel dosage forms supplied from the dosage form transfer unit 300.

In some embodiments, the nozzle 410 may include a plurality of introduction ports and spray ports corresponding to the channels 310. In order to increase the manufacturing speed and to maintain sanitation, a plurality of individual introduction ports 220 and nozzles 410 may be provided in the device 100. In addition, the nozzle 410 may include a plurality of introduction ports and spray ports such that the nozzle functions as a plurality of individual nozzles.

In addition, the dosage form spray unit 400 may include an arm 420 for moving the nozzle 410, and one or more motors for moving the arm 420 in a predetermined direction may be provided.

The dosage form spray unit 400 may spray the hydrogel dosage forms moved through the channels 310 to the outside in order to manufacture a mask pack.

For example, the dosage form spray unit 400 may be a dispensing-type 3D discharger for performing 3D printing in a fused deposition modeling (FDM) mode. The fused deposition modeling (FDM) mode is a mode in which a solid material is liquefied immediately before being sprayed such that an article is manufactured so as to have a stacked structure. The dosage form spray unit 400 may spray hydrogel to manufacture a mask pack.

In addition, the fused deposition modeling (FDM) mode is a mode in which the arm 420 is moved. An FDM delta mode, which is visualized and is executed at high speed, may be used such that the user experiences the mask pack manufacturing process.

In a standby state before spraying, the Delta-Bot arm 420 may move downwards along the Z axis, and in the working state, the Delta-Bot arm 420 may move along the X axis and the Y axis to move the nozzle 410.

In the embodiment of the present invention, the dosage form spray unit 400 adopts the FDM delta mode, in which visualization is excellent. At the time of manufacturing a mask pack, the nozzle 410 moves downwards to dispense hydrogel to the surface of a discharge plate 510 of the dosage form solidification unit 500 according to the operation of the Delta-Bot arm 420. In addition, after dispensing of hydrogel is completed, the nozzle 410 may move upwards according to the operation of the Delta-Bot arm 420.

Meanwhile, the dosage form spray unit 400 may include a nozzle heating unit 430 for heating the hydrogel dosage forms supplied from the dosage form transfer unit 300 such that the temperature of the nozzle 410 is maintained at 60 to 75 degrees.

The dosage form spray unit 400 may divide the discharge surface of the discharge plate 510, to which dosage forms are discharged, into a plurality of regions, and may sequentially discharge the hydrogel dosage forms supplied from the dosage form transfer unit 300 to the divided regions.

That is, the dosage form spray unit 400 may sequentially move the nozzle 400 above the regions such that a required ingredient is discharged to a certain region and the nozzle then moves to the next region.

In addition, the dosage form spray unit 400 may sequentially discharge the hydrogel dosage forms supplied from the dosage form transfer unit 300 depending on the ingredients of the hydrogel dosage forms.

According to the present invention, various ingredients received in a plurality of capsules may be combined to manufacture a mask pack.

In this case, the dosage form spray unit 400 may discharge a predetermined amount of an ingredient in one of the capsules, and may then discharge a predetermined amount of another ingredient in the next capsule.

The dosage form solidification unit 500 may include a discharge plate 510, on which the hydrogel dosage forms discharged from the dosage form spray unit 400 are stacked.

Meanwhile, the front lower-end unit of the hydrogel discharge device 100, i.e. the dosage form solidification unit 500, may be formed in an opening-and-closing-type structure in which it is easy to separate a mask pack.

In addition, the discharge plate 510, on which the dosage forms are discharged and stacked to manufacture a mask pack, may be located at the lowermost end of the hydrogel discharge device 100.

Meanwhile, in some embodiments, the dosage form solidification unit 500 may include a discharge plate heating unit 520 for heating the hydrogel dosage forms discharged from the dosage form spray unit 400.

In the case in which the fluidity of the dosage forms is not high and the gelation of hydrogel is possible at room temperature, a heating or cooling element may not be disposed in the dosage form solidification unit 500. In this case, however, temperature variability is high, and quality variability is also high.

In the case in which a cooling element is disposed in the dosage form solidification unit 500 of the hydrogel discharge device 100 in order to rapidly cool and solidify the hydrogel dosage forms for rapid manufacture, the formerly discharged dosage form and the latterly discharged dosage form may be separated from each other.

Consequently, the temperature in the dosage form solidification unit 500 may be maintained within the range of 50 to 100 degrees in order to maintain the dosage forms in a liquid state for a predetermined time, whereby an interfacial separation problem may be solved.

In the case in which a heating element is used, a heat loss speed is lower than in the case in which a cooling element is operated. Consequently, heat-transfer-solidified-contour dosage forms may be possible, whereby the joined surfaces of the dosage forms may melt, and interfacial separation problem may be partially solved. In addition, when the dosage forms permeate, the fluidity of the dosage forms may be maintained and the dosage forms may permeate into an empty space, whereby an empty interface space may be minimized.

More preferably, the dosage form solidification unit 500 includes a heating element and a cooling element in order to sequentially perform a heating process and a cooling process.

The hydrogel discharge device 100 according to the embodiment of the present invention may further include a communication unit 160 for receiving skin state information from an external electronic device. For example, the communication unit 160 may receive the skin state information from the skin measurement device 50 or a predetermined server.

To this end, the communication unit 160 may include a wireless Internet module for wireless Internet access and/or a short-range communication module for short-range communication.

The wireless Internet module is configured to transmit and receive a wireless signal over a communication network based on wireless Internet technologies.

For example, the wireless Internet technologies may include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High-Speed Downlink Packet Access), and HSUPA (High-Speed Uplink Packet Access). The wireless Internet module transmits and receives data based on at least one wireless Internet technology within a range including unspecified Internet technologies.

In addition, the short-range communication module may support short-range communication using at least one of Bluetooth™, RFID (Radio Frequency Identification), Infrared Data Association (IrDA), UWB (Ultra-Wideband), Zig-Bee, NFC (Near Field Communication), Wi-Fi (Wireless-Fidelity), Wi-Fi Direct, or Wireless USB (Wireless Universal Serial Bus).

The short-range communication module may support wireless communication between the hydrogel discharge device 100 and another electronic device or a network over wireless area networks. The wireless area networks may be wireless personal area networks.

Here, another electronic device may be the skin measurement device 50, a wearable device, or a head-mounted display that is capable of exchanging data with (or that is capable of being operatively connected to) the hydrogel discharge device 100 according to the present invention.

The short-range communication module may sense (or recognize) an electronic device that is located adjacent to the hydrogel discharge device 100 and is capable of communicating with the hydrogel discharge device 100. Furthermore, in the case in which the sensed electronic device is a certified device capable of communicating with the hydrogel discharge device 100 according to the present invention, a processor 150 may transmit at least a portion of the data processed by the hydrogel discharge device 100 to an external electronic device through the short-range communication module. Consequently, the user of the external electronic device may use the data processed by the hydrogel discharge device 100.

The hydrogel discharge device 100 according to the embodiment of the present invention may further include a processor 150 for controlling the overall process of manufacturing the mask pack.

The processor 150 may control the respective units in the hydrogel discharge device 100, such as the capsule introduction unit 200, the dosage form transfer unit 300, the dosage form spray unit 400, and the dosage form solidification unit 500.

In addition, the processor 150 may control the kind or amount of the hydrogel dosage form to be moved to the dosage form transfer unit 300, among the hydrogel dosage forms received in the capsules.

That is, the processor 150 may set the kind of ingredients that are used to manufacture a single mask pack and the mixing concentration thereof, among various dosage-form ingredients introduced as raw material, and may control the respective units in the hydrogel discharge device 100 such that the mask pack is manufactured based on the settings.

The processor 150 may control the kind or amount of the hydrogel dosage form to be moved to the dosage form transfer unit 300, among the hydrogel dosage forms received in the capsules, based on the skin state information received through the communication unit 160.

Meanwhile, the processor 150 may control the respective units in the hydrogel discharge device 100, such as the capsule introduction unit 200, the dosage form transfer unit 300, the dosage form spray unit 400, and the dosage form solidification unit 500, to manufacture a mask pack based on a graphical image included in the skin state information received through the communication unit 160.

In addition, each of the capsule introduction unit 200, the dosage form transfer unit 300, the dosage form spray unit 400, and the dosage form solidification unit 500 according to the embodiment of the present invention may include heating units (250, 320, 430, 520) including a hot-wire-type heat source. In addition, for temperature management, a temperature sensor may be attached to at least some of the capsule introduction unit 200, the dosage form transfer unit 300, the dosage form spray unit 400, or the dosage form solidification unit 500.

The processor 150 may perform control such that the heating units (250, 320, 430, 520) included in each unit is turned on/off based on the temperature sensed by the temperature sensor.

The hydrogel discharge device 100 according to the embodiment of the present invention may further include an input unit 110, a memory 140, an output unit 170, and a power supply unit 180.

The input unit 110 may transmit a signal input by a user to the processor 150. To this end, manipulation buttons may be provided. For example, a power on/off signal from a power on/off button, a start signal from a start button, or a pause signal from a pause button may be transmitted to the processor 150. In addition, the input unit 110 may further include an open button.

The memory 140 may store a program for signal processing and control in the processor 150, and may store data received from the communication unit 160.

The output unit 170 may include a display for visually outputting information and/or a speaker for outputting information in the form of a sound.

The output unit 170 may output at least one of information about capsules to be introduced into the capsule introduction unit 200 or information about capsules that have been introduced into the capsule introduction unit 200 in the form of an image and/or a sound.

The power supply unit 180 may supply external power or internal power to the respective units under the control of the processor 150.

Figure 8:
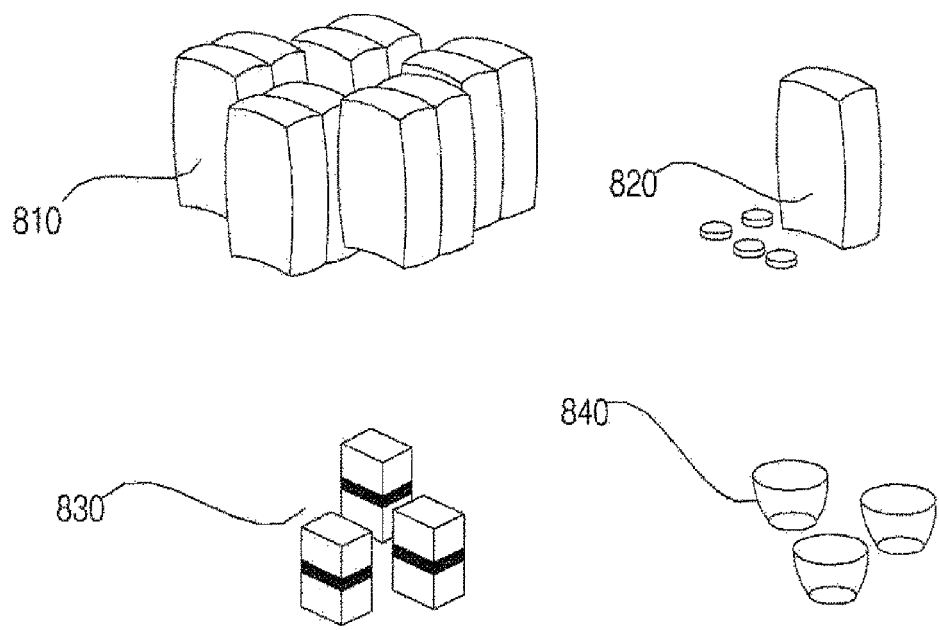
FIG. 8 is a reference view illustrating capsules that are introduced into the hydrogel discharge device according to the embodiment of the present invention.

FIG. 8 is a reference view illustrating capsules that are introduced into the hydrogel discharge device according to the embodiment of the present invention.

In this specification, a description is given based on the case in which hydrogel dosage forms having different ingredients are introduced in the state of being received in a plurality of capsules. Alternatively, the hydrogel dosage forms may be introduced in the state of being received in a cartridge.

Referring to FIG. 8, the hydrogel discharge device 100 according to the embodiment of the present invention may use a large-capacity cartridge 810, such as a 70-dosage cartridge or a 28-dosage cartridge, or a specific-ingredient-based large-capacity cartridge 820, such as a 70-dosage cartridge or a 28-dosage cartridge.

The large-capacity cartridges 810 and 820 have an advantage in that the burden of physical replacement is low; however, these cartridges may negatively impact a user's customized care experience, replacement times of the cartridges may be different from each other, and reliability in storage and sanitation of the cartridges may be deteriorated.

Referring to FIG. 8, the hydrogel discharge device 100 according to the embodiment of the present invention may use a seven-dosage weekly cartridge 830.

In addition, the hydrogel discharge device 100 according to the embodiment of the present invention may use a one-dosage capsule 840 or a seven-dosage weekly capsule.

Consequently, visibility of capsule ingredients is high, and it is advantageous in providing a special customized care experience to a user.

Meanwhile, the weekly cartridge/capsule is further preferable in consideration of the case in which the hydrogel discharge device 100 is used in a shop or at home.

The weekly cartridge/capsule is advantageous in terms of sanitation, since factors affecting emotional quality, such as a capsule introduction experience (a direct manufacturing experience) and a customized care experience, are emphasized and the usable period of the weekly cartridge/capsule starts immediately after being manufactured. In addition, the weekly cartridge/capsule is advantageous in that it is suitable for single-region and two-ingredient customization and a skin regeneration period.

Meanwhile, five or six basic capsule categories may be provided, and the number of capsule categories may be increased.

For example, five basic dosage-form ingredients, such as those pertaining to moisturizing, elasticity increase, nourishment, whitening, and trouble alleviation may be provided in Korea. Consequently, five capsule categories may be provided, and extension is possible within the five categories based on preference.

An example of ingredients of a seven-dosage capsule (weekly capsule) is as follows:

Ingredients: about 74 g
Purified water 56 g
Carrageenan powder 7 g
Glycerin 2.1 g
Functional skin beauty material 9.1 g Carrageenan powder is an example of polymer gel that is soluble in water and enables the formation of hydrogel. If the content of carrageenan powder is too small, it is not possible to obtain desired viscosity. If the content of carrageenan powder is too large, viscosity is excessively increased or carrageenan powder is not completely dissolved in water.

Glycerin is a material that enables a hydrogel composition to come into tight contact with the skin and to permeate the skin.

Meanwhile, according to the embodiment of the present invention, each capsule may correspond to a single ingredient, and ingredients may be variously combined. In addition, different colors may be assigned to combined ingredients.

Meanwhile, the present invention is not limited as to the names of hydrogel reception member, such as "capsule" and "cartridge".

Figure 9:
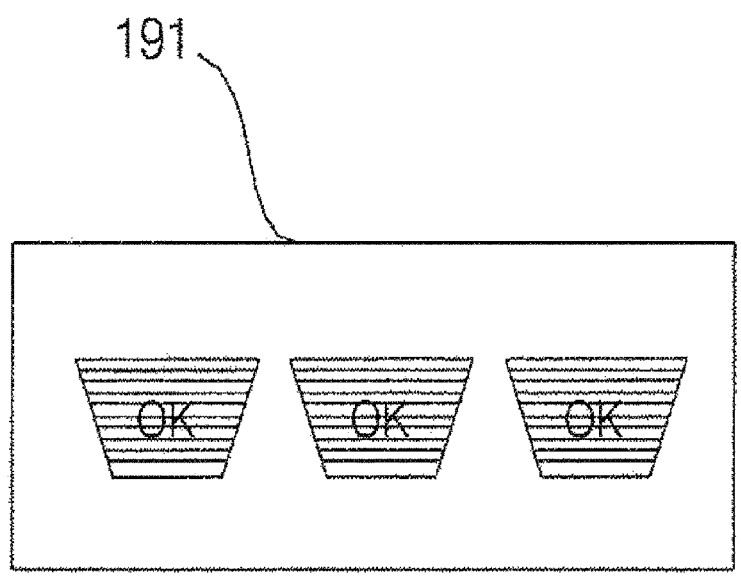
FIG. 9 is a view showing an example of a user interface of the hydrogel discharge device according to the embodiment of the present invention.

FIG. 9 is a view showing an example of a user interface of the hydrogel discharge device according to the embodiment of the present invention.

After measuring the skin state, a sales clerk may show 5 to 6 one-dosage or seven-dosage capsules suitable for the measurement results to a customer, and may then introduce the same into the hydrogel discharge device 100.

One may be selected from among various capsule lineups depending on the customer skin state and preference, and 5 or 6 capsules may be introduced based on the measurement results. The user may confirm this, whereby manufacturing feedback may be reinforced.

The capsules may be configured to be introduced so as to correspond to the location structure without a specific introduction sequence, whereby the cognitive/physical difficulty experience by the user may be reduced.

In some embodiments, when the capsules are introduced into the capsule introduction ports, the capsules may be automatically recognized.

Meanwhile, the output unit 170 of the hydrogel discharge device 100 may visibly/audibly feedback the location state of the capsules.

For example, the hydrogel discharge device 100 may recognize the introduced capsules, and, when the actually introduced capsules do not coincide with the diagnosis results, may issue an audible alarm.

Alternatively, as shown in FIG. 9, the location state of the capsules may be displayed on a display 191 provided in the output unit 170.

Figure 10:
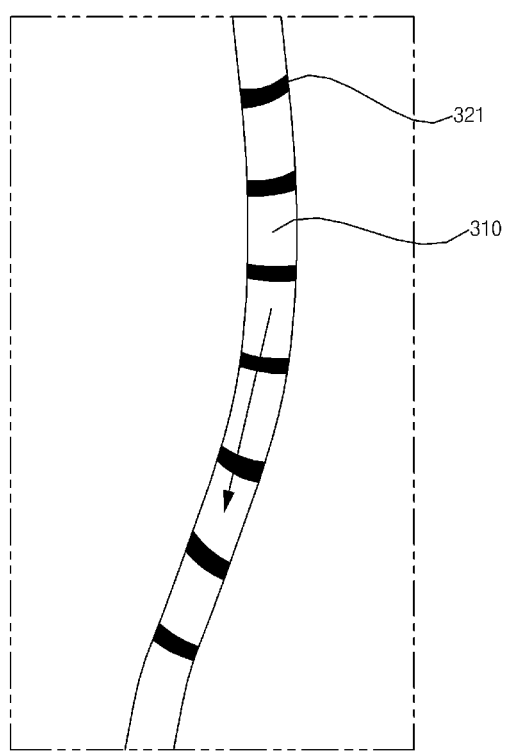
FIG. 10 is an enlarged view showing a portion of a channel of the hydrogel discharge device according to the embodiment of the present invention.

FIG. 10 is an enlarged view showing a portion of the channel of the hydrogel discharge device according to the embodiment of the present invention.

When the sales clerk pushes the start button of the input unit 110 of the hydrogel discharge device 100, a dosage-form ingredient in a capsule may be liquefied and moved to the channel 310 by a heating and pushing structure.

For example, when the start button is pushed, the hot-wire-type heating unit 251 provided in the lower part of the capsule introduction and location structure of the capsule introduction unit 200 may be driven to heat the lower part of the capsule to 70 to 75° C. within 20 seconds, and the dosage-form ingredient in the capsule may be liquefied into a ready state.

Meanwhile, each dosage form may be dynamically controlled according to a channel control algorithm so as to be maintained in a ready state.

Meanwhile, the display 191 of the output unit 170 may display manufacturing information, such as the remaining time and the current process state (manufactured regions).

After the dosage form in the capsule is liquefied, the dosage form may be pushed at a high pressure using the pushing structure or a piston, whereby the dosage form may be sprayed into each channel 310.

The channel 310 may be made of silicone, and the dosage form may move toward the nozzle along each channel 310 through the control of the pneumatic pressure in the channel 300. As shown in FIG. 10, the liquid dosage form may move downwards.

A contact hot-wire 321 type heating unit may be applied to each channel 310 to maintain the channel at about 68° C. such that the dosage form is maintained in a liquid state, and discharging of the dosage form may be controlled through the control of pneumatic pressure according to a moving algorithm in the channel 310. That is, the heating temperature and the pumping pressure may be dynamically controlled to ready or move each ingredient.

Meanwhile, the other dosage forms, excluding the discharged dosage form, may be maintained in a ready state in the channel 310 in the discharge sequence.

Figure 11A:
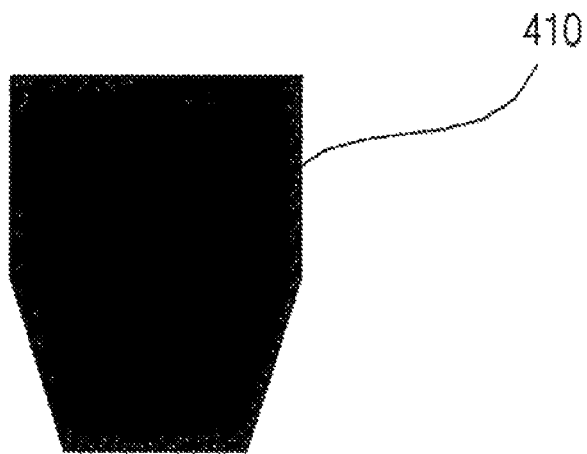
FIGS. 11a to 11c are reference views illustrating a nozzle of the hydrogel discharge device according to the embodiment of the present invention.
Figure 11B:
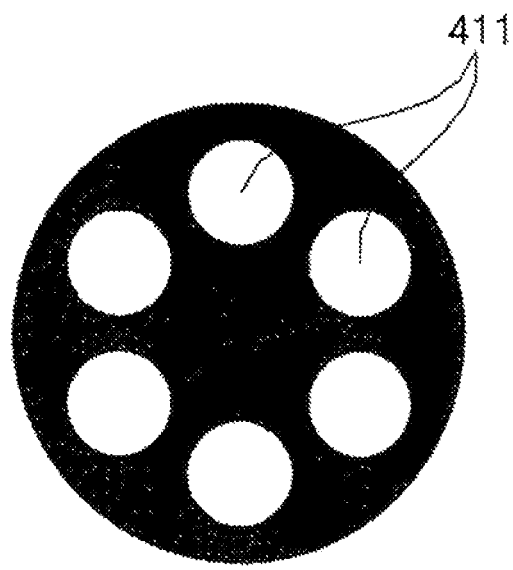
Figure 11C:
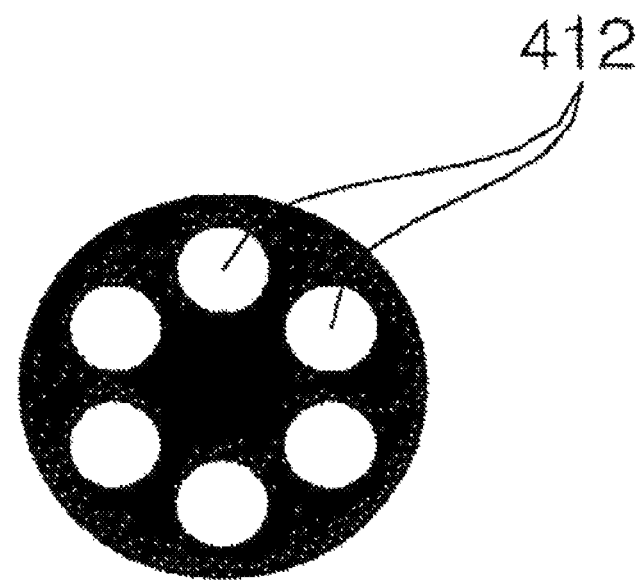

FIGS. 11*a* to 11*c* are reference views illustrating the nozzle 410 of the hydrogel discharge device according to the embodiment of the present invention, wherein FIG. 11*a* is a front view of the nozzle 410, FIG. 11*b* is a top view of the nozzle 410, and FIG. 11*c* is a bottom view of the nozzle 410.

Referring to FIGS. 11*a* to 11*c*, dosage forms may be discharged using a multi-nozzle structure. The nozzle 410 may include a plurality of introduction ports 411 and spray ports 412, which correspond to the channels 310.

Dynamic control may be performed according to the channel algorithm in the discharge sequence in order to discharge dosage forms to desired regions through the nozzle 410.

Figure 12:
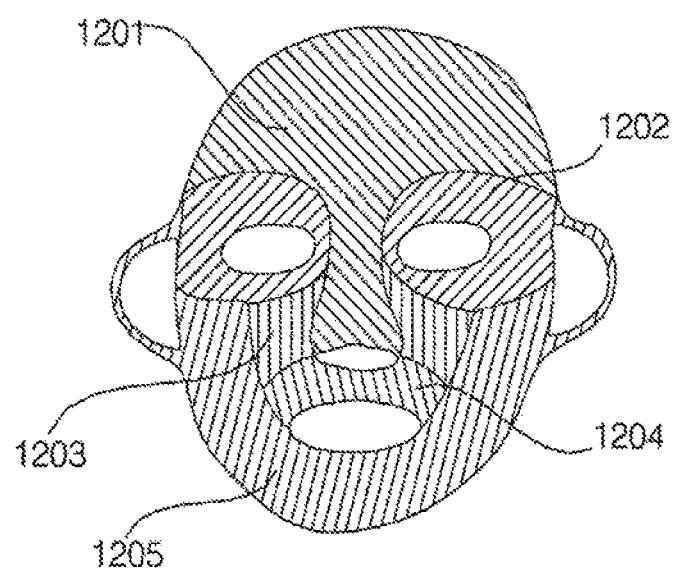
FIG. 12 is a reference view illustrating a mask pack manufactured by the hydrogel discharge device according to the embodiment of the present invention.

FIG. 12 is a reference view illustrating a mask pack manufactured by the hydrogel discharge device according to the embodiment of the present invention.

Referring to FIG. 12, dosage forms may be discharged in the order of the T zone 1201, the eye rims 1202, the nasolabial fold portions 1203, the sides of the mouth 1204, and the U zone 1205. That is, discharging of the dosage forms to the respective regions may be performed in the upward-downward direction.

In some embodiments, dosage forms may be discharged in a single-region and one-ingredient discharge mode corresponding to a first solution based on skin state measurement, a single-region and two-ingredient discharge mode corresponding to first and second solutions based on skin state measurement, or a single-region and multi-ingredient discharge mode for full region customization based on skin state measurement in order to manufacture a mask pack.

In addition, in the case in which contour discharging is performed before discharging to the T zone 1201, the eye rims 1202, the nasolabial fold portions 1203, the sides of the mouth 1204, and the U zone 1205, discharging may be performed to the interiors of the respective regions after forming the contour.

Meanwhile, the liquid state of the discharged dosage forms may be maintained by the hot-wire heating element 521 in the lower discharge plate 510, whereby interfacial separation between the formerly discharged dosage form and the latterly discharged dosage form may be prevented.

Meanwhile, in some embodiments, when discharging to the T zone 1201, the eye rims 1202, the nasolabial fold portions 1203, the sides of the mouth 1204, and the U zone 1205 is completed, as shown in FIG. 12, grips may be further printed at the left and right sides of the upper end of the mask pack in order to achieve easy separation and to prevent the hand from contacting the five regions of the mask pack.

Figure 13:
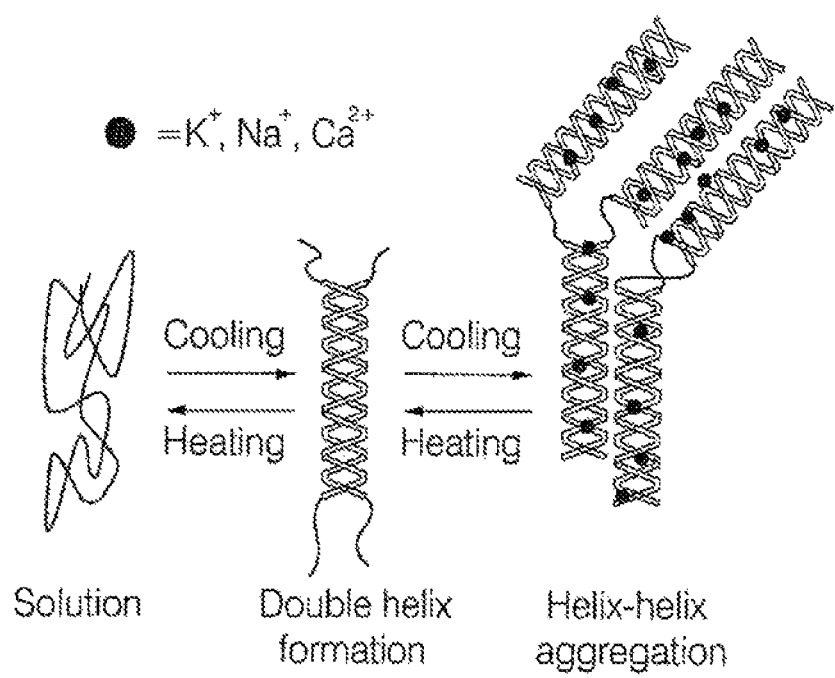
Figure 14:
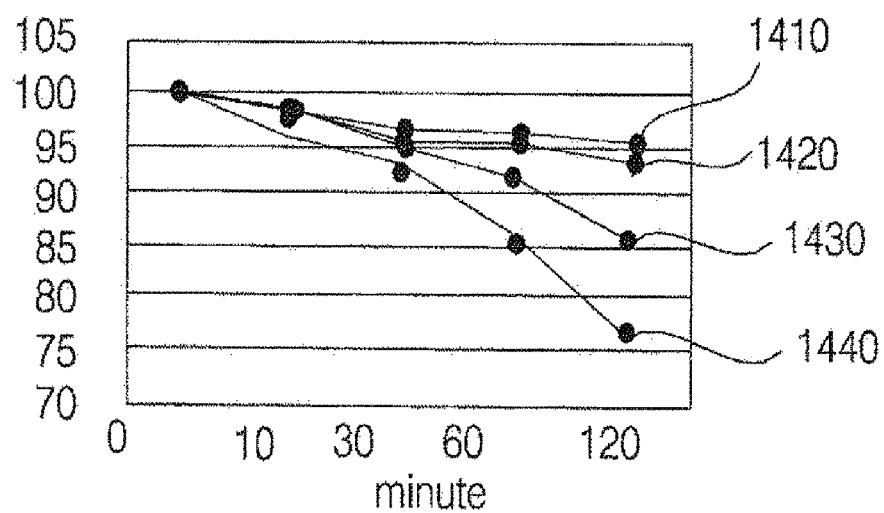

FIGS. 13 to 15 are reference views illustrating hydrogel.

In hydrogel, gum such as carrageenan gum is gelated so as to realize a helix formation, as shown in FIG. 13. Hydrogel gelation conditions include 1) high hydrogel concentration, 2) low temperature, and 3) high cation concentration, such as K+.

In the case of helix-helix intra-aggregation, the interfacial separation between the discharged dosage form and a new dosage form that is discharged may easily occur. In the present invention, therefore, the discharge surface may be maintained at an intermediate or high temperature through the discharge plate heating unit 520 of the dosage form solidification unit 500, whereby the dosage forms may be maintained in a liquid state. Consequently, it is possible to prevent solidification of the formerly discharged dosage form and to induce inter-aggregation between the formerly discharged dosage form and the latterly discharged dosage form.

FIG. 14 is a reference view illustrating temperature and a water release phenomenon, and FIG. 15 is a table showing the physical properties of a dosage form depending on temperature.

FIG. 14 is a graph showing the weight loss rate (fraction) of a hydrogel dosage form over time at temperatures of 4 degrees (1410), 25 degrees (1420), 35 degrees (1430), and 50 degrees (1440).

Referring to FIG. 14, it can be commonly seen that the higher the temperature, the faster the water release speed at temperatures lower than about 50 degrees. In addition, the water release phenomenon is visible only after 2 to 3 minutes or more elapses, depending on the room temperature.

Referring to FIG. 15, hydrogel at −4 degrees or lower is solid, and the gel component contains ingredients and moisturizing water, whereby a water release phenomenon only slightly occurs. In addition, if the temperature is too low, the gel may freeze.

Hydrogel at −4 to 3 degrees is solid. This temperature is the solidification temperature in the current manufacturing process. When the temperature of a cooling chamber is set to −3 to 0 degrees, rapid gelation may occur in the cooling chamber in the temperature range of about 0 to 3 degrees.

Hydrogel at 5 to 15 degrees is solid. When hydrogel is placed at a temperature lower than room temperature, the water release phenomenon may be apparent.

Hydrogel at room temperature is solid, and the water release phenomenon occurs. For this reason, a hydrogel pack is wet and moist when the hydrogel pack is used without spraying additional essence.

Hydrogel at 55 degrees is in a solid to liquid state. Solid gel starts to be converted into liquid gel at temperatures equal to or higher than 55 degrees. Consequently, it is necessary to maintain the temperature higher than 55 degrees in order to maintain the gel in a liquid state.

In the present invention, therefore, heating units (250, 320, 430, 520) is provided in each unit in order to maintain each unit at an appropriate temperature.

Meanwhile, the temperature of 70 to 75 degrees is the liquefaction temperature in the current manufacturing process, and the viscosity of gel at 70 degrees is 5000 to 7000 CPs.

Hydrogel at 80 degrees is liquid. The viscosity of hydrogel decreases as the temperature increases, whereby the fluidity of hydrogel increases. If the fluidity of hydrogel is excessive, however, cooling control may be impossible, and moisture may evaporate from gel.

Meanwhile, the numerical values illustrated in FIGS. and 15 may be changed depending on the kind or concentration of the dosage form. In addition, the numerical values of the temperature illustrated in other parts of this specification may be changed depending on the kind or concentration of the dosage form.

Figure 16:
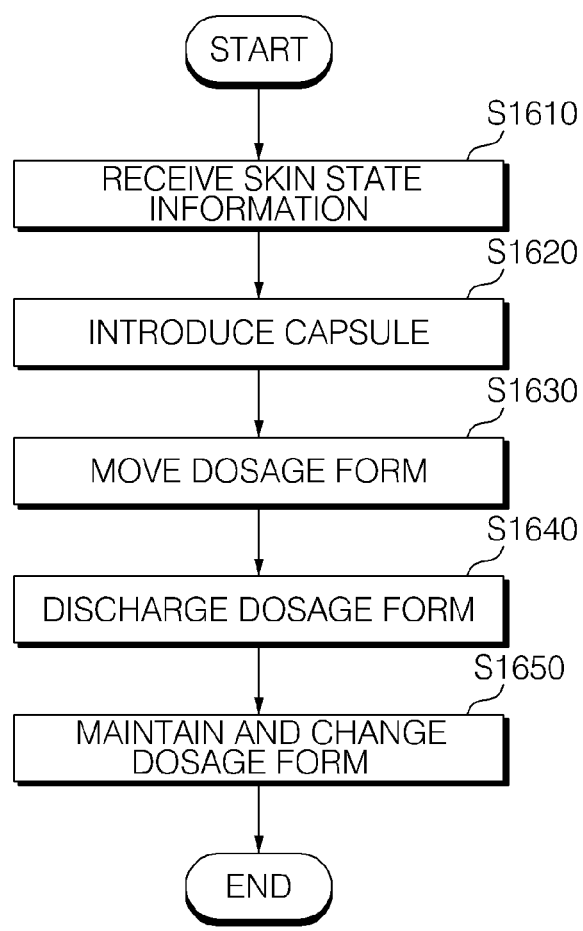
FIG. 16 is a flowchart showing a method of operating the hydrogel discharge device according to the embodiment of the present invention.

FIG. 16 is a flowchart showing a method of operating the hydrogel discharge device according to the embodiment of the present invention.

Referring to FIG. 16, the hydrogel discharge device 100 according to the embodiment of the present invention may receive skin state information from an external electronic device, such as the skin measurement device 50, via the communication unit 160 (S1610).

A plurality of capsules receiving hydrogel dosage forms may be introduced into the hydrogel discharge device 100 based on the skin state information (S1620).

A user or a sales clerk may introduce capsules containing appropriately customized ingredients into the hydrogel discharge device 100 based on the skin state information.

Alternatively, the hydrogel discharge device 100 may select capsules containing appropriately customized ingredients from a plurality of introduced capsules based on the skin state information.

Meanwhile, the heat source in the hydrogel discharge device 100 may be driven, and the hydrogel dosage forms received in the capsules may be moved (S1630).

For example, the hydrogel dosage forms received in the capsules may be heated into a liquid state, and may then be moved to the channels 310. The channels 310 may be heated such that the hydrogel dosage forms move from the upper side to the lower side of the channels 310 in the state of being maintained in the liquid state.

The hydrogel dosage forms moved to the nozzle 410 may be discharged in a predetermined sequence (S1640).

In some embodiments, the discharge surface may be divided into a plurality of regions, and the hydrogel dosage forms may be sequentially discharged to the divided regions.

In addition, the hydrogel dosage forms may be sequentially discharged to the outside depending on the ingredients of the hydrogel dosage forms.

Subsequently, the discharged hydrogel dosage forms may be solidified to manufacture a mask pack (S1650).

Figure 17:
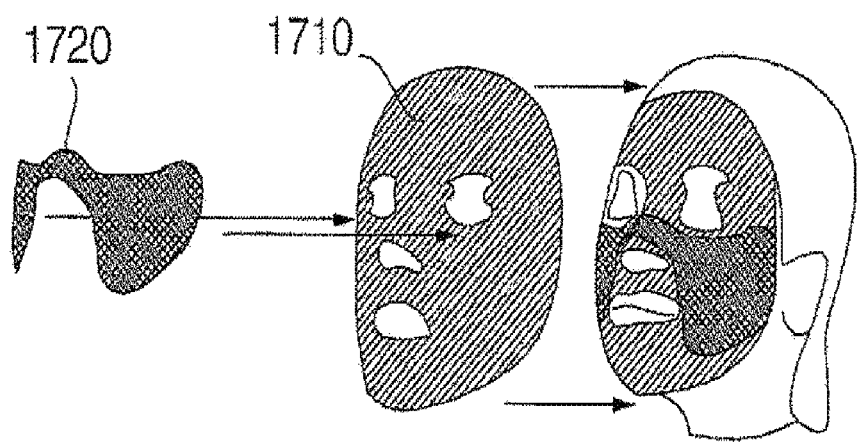
FIGS. 17 and 18 are reference views illustrating a mask pack according to an embodiment of the present invention and the hydrogel discharge device.
Figure 18:
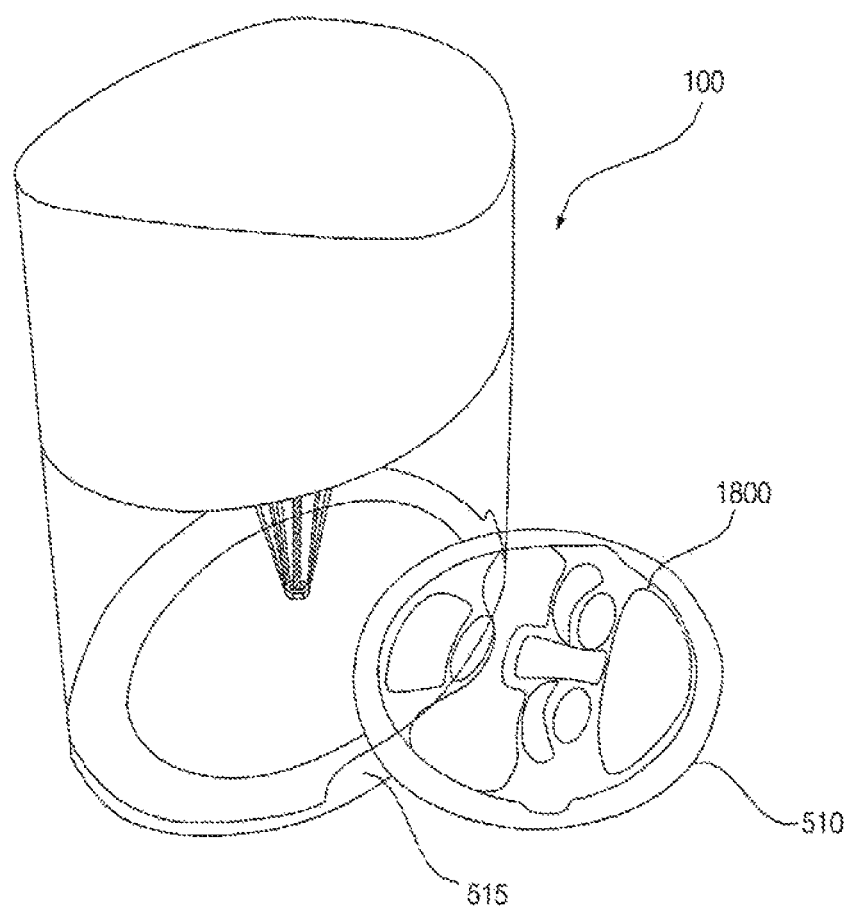

FIGS. 17 and 18 are reference views illustrating a mask pack according to an embodiment of the present invention and the hydrogel discharge device.

Referring to FIG. 17, an anti-aging kit 1720 realized by an attachment-type microcurrent pad may be further attached to a mask pack 1910.

Since the anti-aging kit 1720, which has the absorption acceleration and collagen regeneration effects, is further attached, it is possible to intensively care for the inside of the skin and to regenerate the skin.

Alternatively, a temperature-sensitive dosage form may be used to manufacture a mask pack configured such that the color of the mask pack is changed when the mask pack contacts the skin, or a pH-sensitive dosage form may be used to manufacture a mask pack configured such that the thickness of the mask pack is changed when the mask pack contacts the skin.

Referring to FIG. 18, an opening 515, through which a manufactured mask pack 1800 is removed, may be formed in a portion of the case of the hydrogel discharge device 100.

In addition, the lower discharge plate 510 may be configured to be removed through the opening 515, whereby it is possible to improve ease of separation and attachment of the mask pack 1800 and to secure ease of cleaning.

Alternatively, a door that is capable of being opened and closed to remove a manufactured mask pack 1800 may be formed in a portion of the case of the hydrogel discharge device 100. In this case, when the user pushes the open button of the input unit 110 after a mask pack is manufactured, the opening-and-closing-type structure is opened, whereby the mask pack may be separated forwards.

In addition, the lower discharge plate 510 may be configured to be removed, making it possible to improve ease of separation and attachment of the mask pack 1800 and to secure ease of cleaning.

In consideration of the physical properties of the hydrogel dosage form that the hydrogel discharge device 100 according to the present invention uses as the raw material, the factor that exerts the greatest influence on the phase change of the dosage form is temperature.

Also, in order to perform discharge control, two factors, such as temperature and pressure, are needed for high-temperature liquefaction and discharge based on pressure in consideration of the characteristics of the hydrogel dosage form.

The dosage form may have fluidity depending on the temperature, so as to freely drop. For rapid manufacture of the mask pack and quality control, however, more accurate pressure control is needed while an appropriate temperature is maintained.

Meanwhile, in the case in which spraying for each capsule is adopted in order to define the discharge sequence, the total manufacturing time is increased, and single-region and multi-ingredient customization is difficult.

Preferably, therefore, dosage forms in several capsules are moved to the channels, located in the channels, and discharged from the channels, rather than spraying for each capsule.

In the case in which dosage forms are moved to the channels so as to be in a ready state and then one or more of the dosage forms are discharged, as described above, the manufacturing time is reduced and multi-ingredient customization is possible. However, there exist dosage forms that are ready and not discharged, which must be appropriately managed.

Consequently, heat management of the hydrogel discharge device 100 is important, and it is necessary to accurately control the pressure in the channels in order to dynamically appropriately control the movement of the dosage forms.

In particular, it is important to control the pressure in direction opposite gravity (negative (−) pressure) and the intensity of the pressure in controlling dosage forms having high fluidity.

Hereinafter, therefore, the construction for managing the heat and dosage form state in the device and controlling the movement of the dosage forms will be described in detail with reference to FIGS. 19 to 27.

In the following description, parts identical to those that have been described with reference to FIGS. 1 to 18 will be omitted or described briefly, and at least some of the embodiments described with reference to FIGS. 1 to 18 may be applied to embodiments that will be described below, although described specifically.

Figure 19:
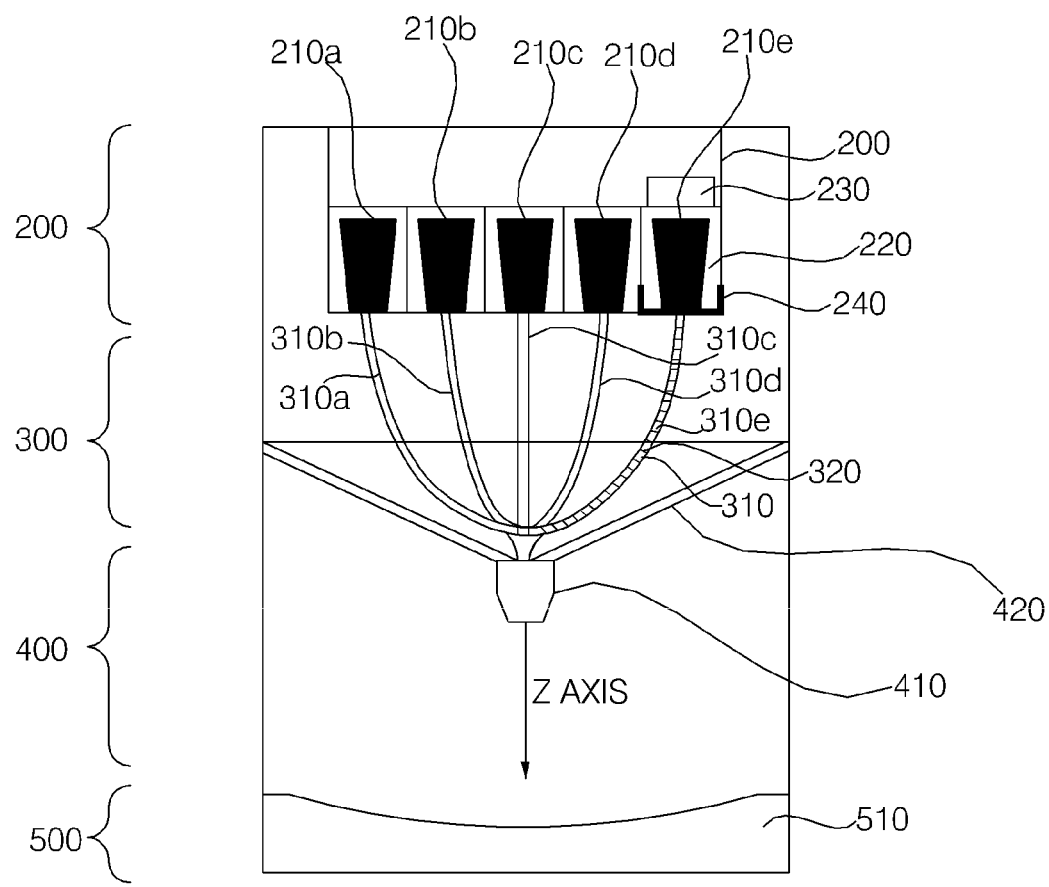
FIG. 19 is a reference view illustrating a heat management structure of the hydrogel discharge device according to the embodiment of the present invention.

FIG. 19 is a reference view illustrating a heat management structure of the hydrogel discharge device according to the embodiment of the present invention.

Figure 20:
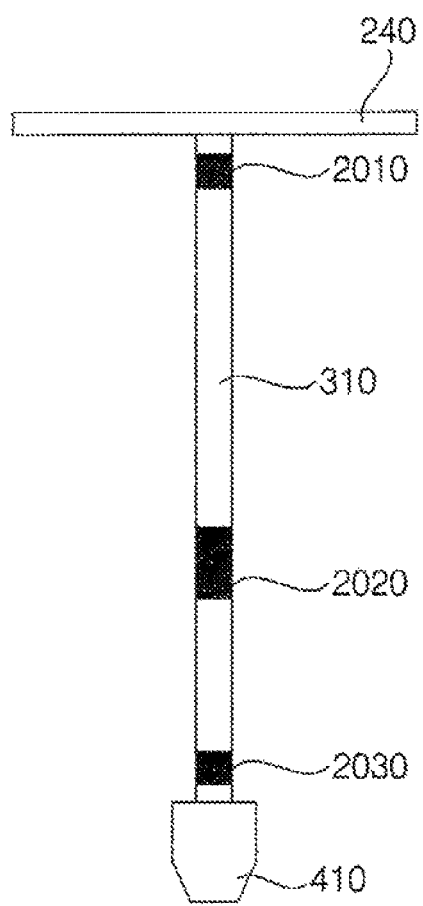
FIGS. 20 and 21 are reference views illustrating a channel sensor of the hydrogel discharge device according to the embodiment of the present invention.
Figure 21:
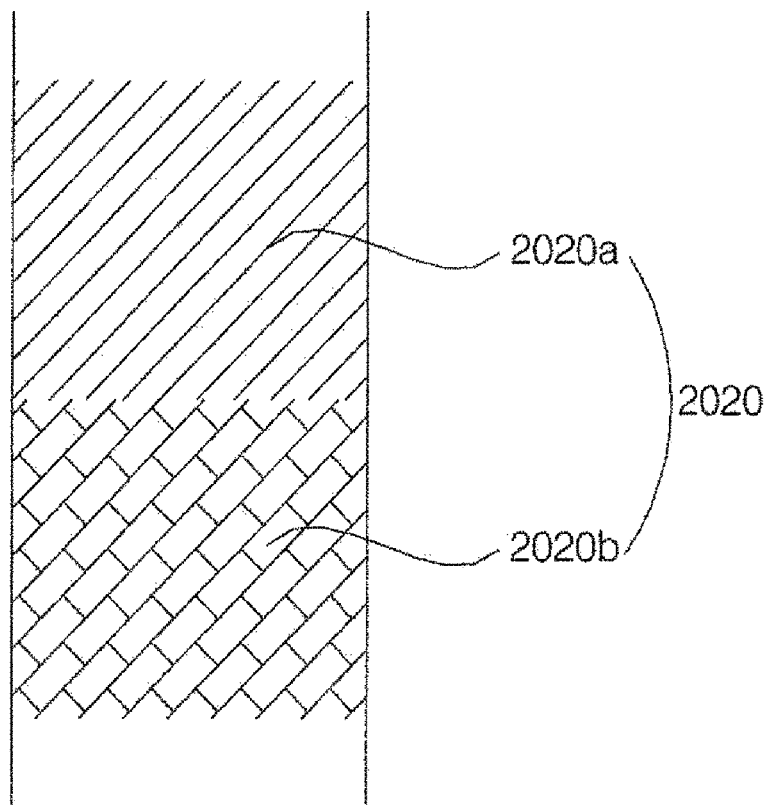

FIGS. 20 and 21 are reference views illustrating a channel sensor of the hydrogel discharge device according to the embodiment of the present invention.

Referring to FIGS. 19 and 20, the hydrogel discharge device 100 according to the embodiment of the present invention may include a capsule introduction unit 200, which includes introduction ports 220, through which a plurality of capsules 210a, 210b, 210c, 210d, and 210e receiving hydrogel dosage forms is introduced, capsule-fastening units 240, in which the introduced capsules 210a, 210b, 210c, 210d, and 210e are located, and heating units for heating the lower parts of the capsules 210a, 210b, 210c, 210d, and 210e, such as capsule hot wires (not shown), and a dosage form transfer unit 300, which includes a plurality of channels 310a, 310b, 310c, 310d, and 310e, through which the hydrogel dosage forms received in the capsules 210a, 210b, 210c, 210d, and 210e are moved, channel heating units 320 for heating the channels 310a, 310b, 310c, 310d, and 310e, such as channel hot wires 320, a plurality of channel sensors 2010, 2020, and 2030 disposed in each of the channels 310a, 310b, 310c, 310d, and 310e, and a pneumatic pressure adjustment unit 330 for adjusting the flow rate and flow in the channels using pneumatic pressure.

The capsule-fastening units 240 may be connected to the channels 310 of the dosage form transfer unit 300 such that the hydrogel dosage forms received in the located capsules 210a, 210b, 210c, 210d, and 210e move to the channels 310.

Meanwhile, the capsule hot wires of the capsule introduction unit 200 may liquefy the dosage forms, and may maintain an intermediate or high temperature of 68 to 70 degrees.

The capsule introduction unit 200 may further include pushing units 230 for applying physical force to move the hydrogel dosage forms liquefied by the driving of the capsule hot wires to the channels 310a, 310b, 310c, 310d, and 310e of the dosage form transfer unit 300.

The pushing units 230 may adjust the movement of the dosage forms in the channels using a pushing structure such as a piezoelectric element.

Meanwhile, although a capsule-fastening unit 240, a pushing unit 230, and a channel hot wire 320 are illustratively shown only in a certain capsule 210e and channel 310e in FIG. 19, the capsule-fastening unit 240, the pushing unit 230, and the channel hot wire 320 are equally disposed at each of the other capsules and channels.

The hydrogel discharge device 100 according to the embodiment of the present invention may further include a dosage form spray unit 400, which includes a nozzle 410 for discharging the hydrogel dosage forms moved from the dosage form transfer unit 300 and a nozzle heating unit 430 for heating the nozzle 410, such as a nozzle hot wire 431, and a dosage form solidification unit 500, which includes a discharge plate 510, to which the hydrogel dosage forms discharged from the dosage form spray unit 400 are stacked, a discharge plate heating unit 520 for heating the discharge plate 510, such as a discharge-plate hot wire 521.

The nozzle hot wire of the dosage form spray unit 400 may maintain a high temperature of 75 to 80 degrees such that the dosage forms can be smoothly discharged.

In addition, the discharge-plate hot wire of the dosage form solidification unit 500 may maintain an intermediate or high temperature of 68 to 70 degrees to prevent interfacial separation between the formerly discharged dosage form and the latterly discharged dosage form.

As previously described with reference to FIGS. 4 to 7, the hydrogel discharge device 100 according to the embodiment of the present invention may further include a processor 150 for controlling the overall process of manufacturing the mask pack.

The processor 150 may control the respective units in the hydrogel discharge device 100, such as the capsule introduction unit 200, the dosage form transfer unit 300, the dosage form spray unit 400, and the dosage form solidification unit 500.

In addition, the processor 150 may set the kind of ingredients that are used to manufacture a single mask pack and the mixing concentration thereof, among various dosage-form ingredients introduced as raw material, and may control the respective units in the hydrogel discharge device 100 such that the mask pack is manufactured based on the settings.

The processor 150 may control the kind or amount of the hydrogel dosage form to be moved to the dosage form transfer unit 300, among the hydrogel dosage forms received in the capsules, based on the skin state information received through the communication unit 160.

In addition, for temperature management, at least some of the capsule introduction unit 200, the dosage form transfer unit 300, the dosage form spray unit 400, and the dosage form solidification unit 500 may include one or more temperature sensors.

The processor 150 may perform control such that the heating units (250, 320, 430, 520) included in the respective units are turned on/off based on the temperatures sensed by the temperature sensors.

Meanwhile, in this embodiment, each of the heating units (250, 320, 430, 520) of the capsule introduction unit 200, the dosage form transfer unit 300, the dosage form spray unit 400, and the dosage form solidification unit 500 uses a hot-wire type heat source (251, 321, 431, 521).

A hot-wire type heating device (electric heater) is a device that is mainly used as a relatively low-temperature heat source. In consideration of the characteristics of a gel dosage form, control at a temperature of 100 degrees or lower is necessary. The time taken to reach a target temperature is within several seconds, which is short, and tensile force is high.

In addition, the electric heater may be made in various form factors, and when a silicone hot wire is used, the heat resistance and durability thereof are high.

In addition, the electric heater may generate heat when voltage is applied thereto without a separate module, and is inexpensive, and the time taken to reach a target temperature may be further reduced as the voltage is increased.

In addition, according to the embodiment of the present invention, a hot wire including a thermistor may be used, whereby a separate temperature sensor may not be further included.

For example, in the present invention, a Teflon (PTFE) hot wire including a thermistor may be used as a hot wire of each unit.

The Teflon (PTFE) hot wire exhibits excellent properties, such as a non-stick property, in which no material is attached to a Teflon-coated surface, heat resistance, in which the hot wire is used at a temperature of −260 to +260 degrees and the hot wire withstands 300 degrees when used for a short time, non-wettability, in which water or oil does not stick to a Teflon-coated surface, whereby easy maintenance is possible, a low coefficient of friction, in which the hot wire is a solid having the smallest coefficient of friction, chemical resistance, in which the hot wire has stability against chemicals and chemicals are prevented from permeating the hot wire, and high and unique electrical properties, in which the hot wire has a low dielectric constant within a wide frequency band.

The processor 150 may control the capsule hot wires, the channel hot wires, the nozzle hot wire, and the discharge-plate hot wire to manage heat and a dosage form state during the manufacture of the mask pack.

The processor 150 may control the capsule hot wires to maintain the temperature of the capsule introduction unit 2100 at 70 to 75 degrees such that the dosage forms are liquefied so as to have fluidity and are in a ready state.

The processor 150 may control the channel hot wires 320 to maintain the temperature of the channels 310 at 68 to 70 degrees such that the liquid state and fluidity of the dosage forms are maintained and the dosage forms are transferred.

The processor 150 may control the nozzle hot wire to maintain the temperature of the nozzle 410 at 75 to 80 degrees such that the liquid state of the dosage forms is maintained and the fluidity of the dosage forms is improved, whereby the dosage forms are smoothly discharged.

The processor 150 may control the discharge-plate hot wire to maintain the temperature of the discharge plate 510 at 68 to 70 degrees such that interfacial separation is prevented.

The channel sensors 2010, 2020, and 2030 for sensing the position and flow of the dosage forms may be provided in each of the channels 310a, 310b, 310c, 310d, and 310e.

The channel sensors 2010, 2020, and 2030 may include a first sensor 2010 disposed at the capsule introduction unit 200 side inlet in the channel 310, a third sensor 2030 disposed at the dosage form spray unit 400 side outlet in the channel 310, and a second sensor 2020 disposed between the first sensor 2010 and the third sensor 2030.

That is, in this embodiment, three channel sensors 2010, 2020, and 2030 sense the movement of a dosage form. The channel sensors 2010, 2020, and 2030 may sense the position, flow speed, and flow direction of the dosage form using a microcurrent sensor, a leakage sensor, a pressure sensor, or a piezoelectric element.

In some embodiments, the length (sensing range) of the sensor may be increased in order to increase a sensing range and to enable sensing of the flow speed and direction of the dosage form.

The first sensor 2010 is a sensor for sensing whether the dosage form is discharged from each capsule to the channel 310. When the first sensor 2010 senses the dosage form, the pneumatic process may be ready.

The third sensor 2030 is a sensor for sensing whether the dosage form is discharged from the channel 310 to the nozzle 410. When the third sensor 2030 continuously senses the dosage form, it may mean the transition from the state immediately before discharging to the dosage form discharging process.

Referring to FIG. 21, the second sensor 2020 may include an upper sensor 2020a disposed at the upper side and a lower sensor 2020b disposed at the lower side. That is, the second sensor 2020 may be constituted as a bundle of two sensors.

As shown in FIG. 21, the second sensor 2020 may be constituted by an upper sensor 2020a and a lower sensor 2020b, which are successively disposed, or may be constituted by a bundle of two sensors that are spaced apart from each other.

The second sensor 2020 is a core sensor for sensing the movement of the dosage form in order to control the movement of the dosage form. Based on the difference between the results of sensing performed by the second sensor 2020, the pneumatic pressure adjustment unit 330 supplies positive (+) pneumatic pressure (or positive pressure) in the direction of gravity or negative (−) pneumatic pressure (or negative pressure) in the direction opposite gravity.

Referring to FIG. 21, two or more independent sensors 2020a and 2020b are present in the second sensor bundle 2020, and the flow direction and speed of the dosage form may be checked through interaction between the sensors 2020a and 2020b in the bundle 2020.

For example, the flow direction of the dosage form may be checked through the dosage-form-sensing sequence of the sensors 2020a and 2020, and the flow speed of the dosage form may be checked through the sensing time.

In the case in which the dosage form has high fluidity, the dosage form may directly move to the third sensor 2030 via the second sensor 2020. Even in the case in which discharging is prevented using high negative pressure, therefore, discharge control may not be possible.

Consequently, the second sensor 2020 is constituted by a bundle of independent sensors 2020a and 2020b in order to increase the sensitivity and sensing range thereof and to sense the moving speed and direction of the dosage form, whereby it is possible to more rapidly control the discharge of a dosage form having high fluidity.

In addition, even in the case in which several pneumatic modes are repeatedly executed for accurate control, a practical countermeasure is possible.

Meanwhile, when the discharge process is observed based on the movement of the dosage form in the channel 310 and the sensing of the dosage form, the discharge process may be performed in the sequence of moving the dosage form from the capsule to the channel, holding the dosage form at a predetermined position in the channel 310, for example, near the second sensor 2020, and discharging the dosage form from the channel 310.

More specifically, in the state in which a dosage form that is not sensed by the first to third channel sensors 2010, 2020, and 2030 does not enter the channel 310, only the first sensor senses the dosage form immediately after the dosage form moves to the channel 310. At this time, the pneumatic pressure adjustment unit 330 may ready the pneumatic pressure process.

Subsequently, the dosage form moves downwards, and the first sensor 2010 and the second sensor 2020 sense the dosage form, and the pneumatic pressure adjustment unit 330 may supply appropriate pneumatic pressure such that the dosage form is held at a predetermined position in the channel 310, for example, near the second sensor 2020.

When at least one dosage form is ready to be discharged, the discharge process is commenced, and the dosage form may be sensed by the third sensor 2030, which is disposed at the nozzle 410 side outlet in the channel. In this case, the first sensor 2010 and the second sensor 2020 may also sense the dosage form depending on the discharge sequence and the embodiment. As the dosage form is discharged, the first sensor 2010, the second sensor 2020, and the third sensor 2030 may not sequentially sense the dosage form.

After the discharging is completed, the dosage form moves out of the channel 310, whereby none of the first sensor 2010, the second sensor 2020, and the third sensor 2030 sense the dosage form.

The processor 150 may perform control such that appropriate pneumatic pressure is supplied to the channel 310 based on the position of the dosage form sensed by the channel sensors 2010, 2020, and 2030. The pneumatic pressure adjustment unit 330 may apply pneumatic pressure to the channel under the control of the processor 150.

FIG. 22 is a reference view illustrating the classification of pneumatic pressure according to an embodiment of the present invention, wherein the classification of pneumatic pressure into five categories is defined in a table.

The classified pneumatic pressures may correspond to pneumatic pressure modes in which the pneumatic pressure adjustment unit 330 is operated.

FIG. 22 illustrates that pneumatic pressure is classified into five categories; however, the present invention is not limited thereto. For example, pneumatic pressure may be classified into seven or eleven units, and the pneumatic pressure mode of the pneumatic pressure adjustment unit 330 may be controlled based thereon, whereby more accurate control is possible.

Referring to FIG. 22, the pneumatic pressure applied in the direction of gravity is defined as positive pressure (or + pressure), and the pneumatic pressure applied in the direction opposite gravity is defined as negative pressure (or − pressure).

A first mode is a mode in which positive pressure having second pneumatic pressure intensity in the direction of gravity is supplied. The second pneumatic pressure intensity may be intensity to control the minimum fluidity of a dosage form, and may be intensity to move a dosage form in a stationary state or an almost stationary state downwards.

In this specification, that Nth pneumatic pressure is applied may mean that the pneumatic pressure adjustment unit 330 is operated in an Nth mode.

A second mode is a mode in which positive pressure having first pneumatic pressure intensity in the direction of gravity is supplied. The first pneumatic pressure intensity may be 50% of the second pneumatic pressure intensity, and may be basic positive pressure intensity.

A third mode is a mode in which the pneumatic pressure adjustment unit 330 is not operated.

A fourth mode is a mode in which negative pressure having first pneumatic pressure intensity in the direction opposite gravity is supplied. The first pneumatic pressure intensity may be intensity to hold the average fluidity of a dosage form, and may be intensity to hold a dosage form that moves downwards at a general average level.

A fifth mode is a mode in which negative pressure having second pneumatic pressure intensity in the direction opposite gravity is supplied. The second pneumatic pressure intensity may be intensity to hold the maximum fluidity of a dosage form, and may be higher than the first pneumatic pressure intensity.

Meanwhile, in order to manage the movement of a dosage form, the state in which the dosage form is sensed in the discharge process is important, rather than which sensor senses the dosage form.

In addition, appropriate pneumatic pressure may be supplied based on the position and current state of the dosage form in order to control the movement of the dosage form in the channel.

Hereinafter, the discharge process and the dosage form movement algorithm will be described in more detail.

Figure 23:
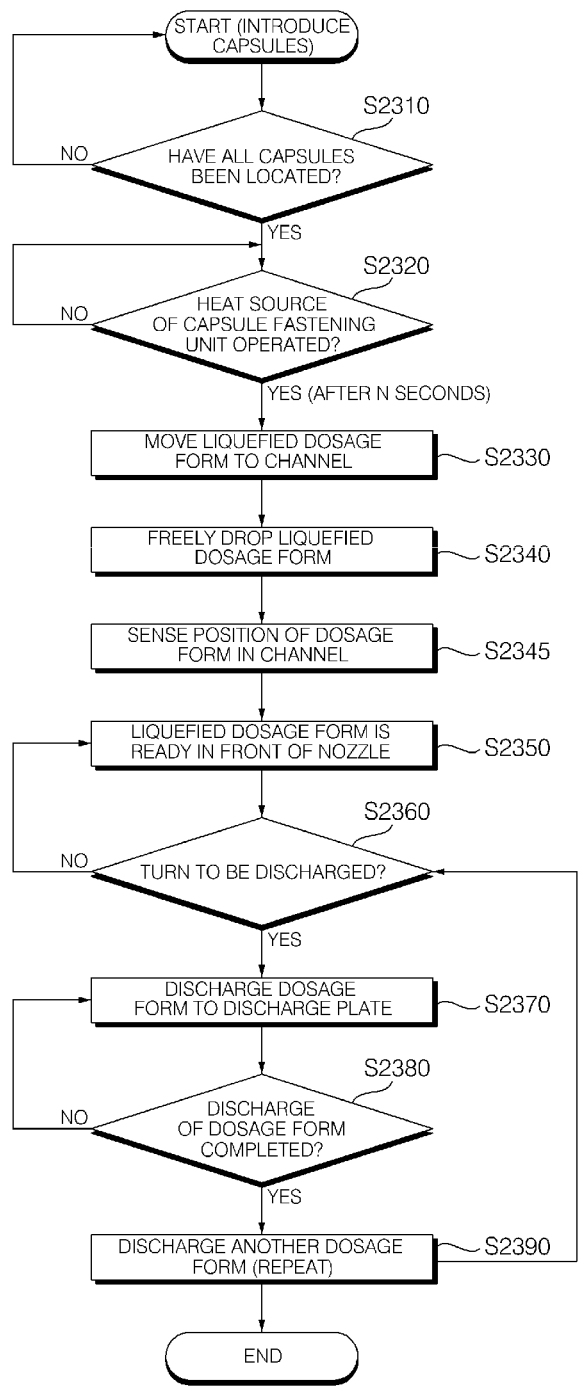
FIG. 23 is a flowchart showing the method of operating the hydrogel discharge device according to the embodiment of the present invention.

FIG. 23 is a flowchart showing the method of operating the hydrogel discharge device according to the embodiment of the present invention.

Referring to FIG. 23, the capsule hot wires may be driven according to the manipulation of the start button of the input unit 110 in order to heat the lower parts of a plurality of capsules receiving hydrogel dosage forms (S2320).

In some embodiments, whether the capsules have been located may be automatically determined (S2310), and then heating of the lower parts of the capsules may be commenced (S2320).

When the capsules are located in the capsule-fastening units 240, the solid dosage forms in the capsules may be liquefied using the capsule hot wires 251 of the capsule-fastening units 240.

Meanwhile, the hydrogel dosage forms in the capsules are liquefied after N seconds according to heating of the lower parts of the capsules.

When the dosage forms are sufficiently liquefied, the liquefied dosage forms may be moved from the capsules to the channels using the pushing units 230 configured to push the capsule-fastening units 240 (S2330).

After N seconds, during which the hydrogel dosage forms are liquefied, the pushing units 230 of the capsule introduction unit 200 may apply physical force to the capsules such that the liquefied dosage forms are moved to the channels 310 (S2330).

Meanwhile, the channel hot wires 320 may be operated in response to the driving of the pushing units 230, and the liquefied dosage forms may freely drop and move downwards in the channels 310 (S2340).

The pneumatic pressure that is supplied to the channels 310 may be adjusted depending on the dosage-form-discharging sequence (S2345). The channel sensors 2010, 2020, and 2030 of the dosage form transfer unit 300 may sense the position of the dosage forms in the channels 310, and the pneumatic pressure adjustment unit 330 may adjust the fluidity of the dosage forms using pneumatic pressure in order to adjust the position and movement of the dosage forms in the channels (S2345).

The processor may perform control such that the pneumatic pressure supplied to the channels is changed depending on the dosage-form-discharging sequence.

For example, the processor 150 may perform control such that the mode of the pneumatic pressure adjustment unit 330 in a channel corresponding to a dosage form whose turn it is to be discharged is different from the mode of the pneumatic pressure adjustment unit 330 in channels corresponding to dosage forms whose turn it is not to be discharged.

In addition, the processor 150 may perform control such that the mode of the pneumatic pressure adjustment unit 330 is changed based on the position and state of the dosage forms during the movement of the dosage forms.

For example, control may be performed such that pneumatic pressure having the first intensity in the direction of gravity is supplied to one of the channels whose turn it is to be discharged and such that pneumatic pressure having intensity set based on the current position of the dosage form is supplied to the others of the channels whose turn it is not to be discharged in the direction set based on the current position of the dosage form.

The hydrogel dosage forms in the respective channels may be ready to be discharged in front of the nozzle 410 (S2350). Meanwhile, one or more dosage forms whose turn it is to be discharged may be ready to be discharged in front of the nozzle 410, and the other dosage forms may be held at predetermined positions in the channels 310.

For example, a hydrogel dosage form whose turn it is to be discharged, among the dosage forms moved from the capsules, may be moved to the nozzle 410 while being maintained in a liquefied state as the result of heating a corresponding one of the channels 310.

In addition, a hydrogel dosage form whose turn it is not to be discharged, among the dosage forms moved from the capsules, may be held at a predetermined position in a corresponding one of the channels 310 while being maintained in a liquefied state as the result of heating the channel 310.

The liquefied dosage forms moved into the channels 310 may be maintained in a liquefied state by the intermediate- or high-temperature channel hot wires.

In the case in which a dosage form whose turn it is to be discharged, the dosage form may be moved to the nozzle 410 through the pneumatic pressure adjustment unit 330. In the case in which a dosage form whose turn it is not to be discharged, the dosage form may be held in a liquefied state at an appropriate position in a corresponding one of the channels 310 through the pneumatic pressure adjustment unit 330.

The algorithm of movement of dosage forms in the channels using pneumatic pressure will be described below in detail with reference to FIGS. 24 to 27.

Meanwhile, the nozzle 410 may discharge the moved hydrogel dosage forms to the discharge plate 510, and the hydrogel dosage forms stacked on the discharge plate 510 may be solidified to manufacture a mask pack.

The dosage form spray unit 400 may divide the discharge surface of the discharge plate 510, to which the dosage forms are discharged, into a plurality of regions, and may sequentially discharge the hydrogel dosage forms supplied from the dosage form transfer unit 300 to the divided regions.

That is, the dosage form spray unit 400 may sequentially move the nozzle 400 above the regions such that a required ingredient is discharged to a certain region and the nozzle then moves to the next region.

In addition, the dosage form spray unit 400 may sequentially discharge the hydrogel dosage forms supplied from the dosage form transfer unit 300 depending on the ingredients of the hydrogel dosage forms.

According to the present invention, various ingredients received in a plurality of capsules may be combined to manufacture a mask pack.

In this case, the dosage form spray unit 400 may discharge a predetermined amount of an ingredient in one of the capsules, and may then discharge a predetermined amount of another ingredient in the next capsule.

Meanwhile, referring to FIG. 23, one of the hydrogel dosage forms whose turn it is to be discharged may be determined (S2360), and the hydrogel dosage form that has the turn to be discharged may be discharged to the discharge plate 510 according to the driving of the nozzle hot wire and/or the pneumatic pressure adjustment unit 330 (S2370).

The hydrogel dosage form that has the turn to be discharged may move close to the nozzle 410, and may be discharged onto the discharge plate in the state in which the fluidity of the dosage form is increased by the high-temperature nozzle hot wire (S2370).

When the discharge of the dosage form is completed (S2380), the next dosage form may be discharged (S2390).

Meanwhile, in order to prevent interfacial separation, the fluidity of the discharged dosage forms may be maintained by the discharge-plate hot wire before cooling.

FIGS. 24 to 27 are reference views illustrating an algorithm in which the dosage form is moved in the channel of the hydrogel discharge device according to the embodiment of the present invention.

The processor 150 may determine the discharge sequence of capsule dosage forms based on the skin state measurement solution result included in the skin state information received from the skin measurement device 50 and the region discharge sequence.

For example, it is assumed that the skin-state-measurement-based solution result of the first region, among the first to fifth regions, such as the T zone, the eye rims, the nasolabial fold portions, the sides of the mouth, and the U zone, is solution capsule A, among solution capsules A to E, the skin-state-measurement-based solution result of the second region is solution capsule B, and a dosage form is discharged first to the first region, among the first to fifth regions.

The processor 150 may perform control such that the dosage form in solution capsule A is discharged first to the first region through a channel connected to the capsule introduction port into which solution capsule A is introduced.

In the case in which it is the turn of the dosage forms in solution capsules A and B to be discharged, the processor 150 may perform control such that the dosage forms are discharged to the discharge plate 510 using positive (+) pneumatic pressure. In the case in which it is the turn of the dosage forms in solution capsules A and B to be discharged, the processor 150 may perform control such that the dosage forms are prevented from being discharged using negative (−) pneumatic pressure.

In addition, it is possible to accurately control discharge sequence/non-discharge sequence using five pneumatic pressure intensity categories based on the second sensor 2020 (2020a and 2020b).

In the case in which a dosage form in a capsule is moved into a corresponding channel 310 due to the pushing structure included in the capsule introduction unit 200 and free dropping of the dosage form and the pneumatic pressure process is ready, the following three basic cases may principally exist.

Case 1: the case in which the viscosity of a dosage form is very high, whereby the dosage form does not reach the second sensor 2020, i.e. the case in which only the first sensor 2010 senses the dosage form but the second sensor 2020 do not sense the dosage form Case 2: the case in which a dosage form having normal viscosity is continuously held near the second sensor 2020, i.e. the case in which the second sensor 2020 continuously sense the dosage form but the third sensor 2030 do not sense the dosage form Case 3: the case in which a dosage form having low viscosity (high fluidity) rapidly flows toward the third sensor 2030 via the second sensor 2020

Figure 24:
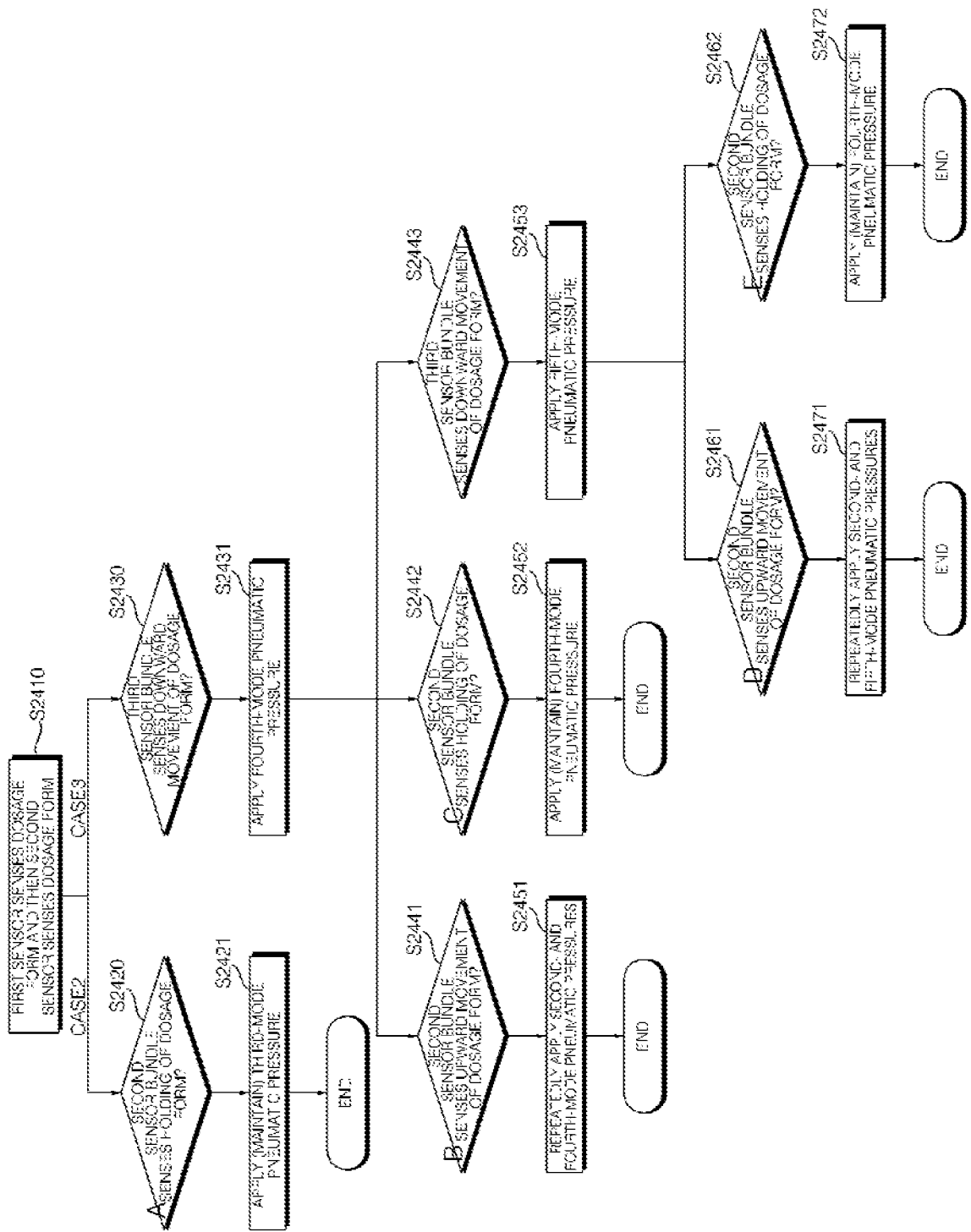
FIGS. 24 to 27 are reference views illustrating an algorithm in which a dosage form is moved in the channel of the hydrogel discharge device according to the embodiment of the present invention.

FIG. 24 shows a dosage form movement algorithm in Case 2 and Case 3, which may be applied in the case in which it is not the turn of a dosage form to be discharged or the dosage form is in a ready state.

When a dosage form in a capsule is moved into a corresponding channel 310 due to the pushing structure included in the capsule introduction unit 200 and free dropping of the dosage form, the first sensor 2010 senses the dosage form, and then the second sensor 2020 senses the dosage form (S2410).

At this time, the case in which a dosage form having normal viscosity is continuously held near the second sensor 2020, whereby the second sensor 2020 continuously senses the dosage form but the third sensor 2030 do not sense the dosage form (Case 2), may occur.

In the case in which the second sensor 2020 senses holding of the dosage form in Case 2 (S2420), the pneumatic pressure adjustment unit 330 may be operated in the third mode (S2421). In the third mode, no pneumatic pressure is supplied.

That is, in the case in which the first sensor 2010 and the second sensor 2020 sense the hydrogel dosage form, the third sensor 2030 does not sense the hydrogel dosage form, and holding of the hydrogel dosage form is sensed in a region corresponding to the second sensor 2020, the pneumatic pressure adjustment unit 330 supplies no pneumatic pressure to the channel 310.

In addition, the case in which a dosage form having low viscosity (high fluidity) rapidly flows toward the third sensor 2030 via the second sensor 2020 (Case 3) may occur.

In the case in which the second sensor 2020 senses the downward movement of the dosage form in Case 3 (S2430), the pneumatic pressure adjustment unit 330 is operated in the fourth mode in order to prevent discharging of a dosage form whose turn it is not to be discharged (S2431). In the fourth mode, basic negative pressure having first intensity in the direction opposite gravity is supplied.

That is, in the case in which the first sensor 2010, the second sensor 2020, and the third sensor 2030 sense the hydrogel dosage form and in which the second sensor 2020 senses the downward movement of the dosage form, the pneumatic pressure adjustment unit 330 may supply pneumatic pressure having first intensity in the direction opposite gravity to the channel 310.

Subsequently, the pneumatic pressure adjustment unit 330 may adjust pneumatic pressure based on the state and direction of the movement of the dosage form sensed by the second sensor 2020.

For example, in the case in which the second sensor 2020 senses the upward movement of the dosage form (S2441), the pneumatic pressure adjustment unit 330 may be sequentially and repeatedly operated in the second mode and the fourth mode (S2451).

That is, in the case in which the second sensor 2020 senses the upward movement of the hydrogel dosage form after the pneumatic pressure having the first intensity in the direction opposite gravity is supplied (S2431), the pneumatic pressure adjustment unit 330 may repeatedly supply pneumatic pressure having first intensity in the direction of gravity and pneumatic pressure having first intensity in the direction opposite gravity to the channel 310.

Consequently, the upward movement of the dosage form may be stopped, and the dosage form may be held in place.

Meanwhile, in the case in which the second sensor 2020 senses holding of the dosage form (S2442), the pneumatic pressure adjustment unit 330 may be continuously operated in the fourth mode (S2452).

That is, in the case in which holding of the hydrogel dosage form is sensed in a region corresponding to the second sensor 2020 after the pneumatic pressure having the first intensity in the direction opposite gravity is supplied (S2431), the pneumatic pressure adjustment unit 330 may continuously supply pneumatic pressure having first intensity in the direction opposite gravity.

Consequently, the dosage form may be held.

Meanwhile, in the case in which the second sensor 2020 senses the downward movement of the dosage form (S2443), the pneumatic pressure adjustment unit 330 may be continuously operated in the fifth mode (S2453). That is, in the case in which the second sensor 2020 senses the downward movement of the hydrogel dosage form after the pneumatic pressure having the first intensity in the direction opposite gravity is supplied (S2431), the pneumatic pressure adjustment unit 330 may supply pneumatic pressure having second intensity, which is greater than the first intensity, in the direction opposite gravity.

Consequently, at least the downward movement of the dosage form may be stopped, or the dosage form may be moved upwards.

Subsequently, in the case in which the second sensor 2020 senses the upward movement of the hydrogel dosage form (S2461), the pneumatic pressure adjustment unit 330 may be repeatedly operated in the second mode and the fifth mode (S2471).

That is, in the case in which the second sensor 2020 senses the upward movement of the hydrogel dosage form after the pneumatic pressure having the second intensity in the direction opposite gravity is supplied (S2453), the pneumatic pressure adjustment unit 330 may repeatedly supply pneumatic pressure having second intensity in the direction opposite gravity and pneumatic pressure having first intensity in the direction of gravity.

Consequently, the upward movement of the dosage form may be stopped, and the dosage form may be held in place.

In the case in which the second sensor 2020 senses holding of the dosage form (S2462), the pneumatic pressure adjustment unit 330 may be continuously operated in the fifth mode (S2472).

That is, in the case in which holding of the hydrogel dosage form is sensed in a region corresponding to the second sensor 2020 after the pneumatic pressure having the second intensity in the direction opposite gravity is supplied (S2453), the pneumatic pressure adjustment unit 330 may continuously supply pneumatic pressure having second intensity in the direction opposite gravity.

Figure 25:
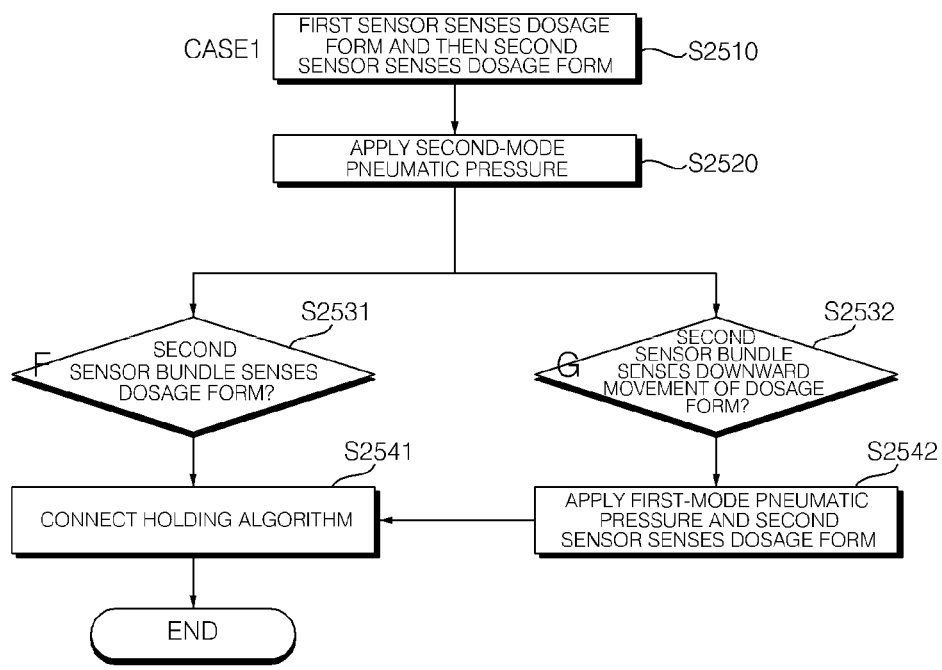

FIG. 25 shows a dosage form movement algorithm in Case 1, which may be applied in the case in which it is not the turn of a dosage form to be discharged or the dosage form is in a ready state.

When a dosage form in a capsule is moved into a corresponding channel 310 due to the pushing structure included in the capsule introduction unit 200 and free dropping of the dosage form, the first sensor 2010 senses the dosage form, but the second sensor 2020 does not sense the dosage form (S2510).

In this case, the pneumatic pressure adjustment unit 330 may be operated in the second mode (S2520).

That is, in the case in which only the first sensor 2010 senses the hydrogel dosage form but the second sensor 2020 and the third sensor 2030 do not sense the hydrogel dosage form, the pneumatic pressure adjustment unit 330 may supply pneumatic pressure having first intensity in the direction of gravity to the channel 310 (S2520).

Even in the case in which the viscosity of the dosage form is very high and thus the dosage form does not reach the second sensor 2020, therefore, it is possible to move the dosage form.

Subsequently, in the case in which the dosage form is moved and sensed by the second sensor 2020 (S2531), operation may be performed according to the holding algorithm described with reference to FIG. 24 (S2541).

In the case in which the second sensor 2020 does not sense the dosage form (S2532) even though the pneumatic pressure having the first intensity in the direction of gravity is supplied (S2520), the pneumatic pressure adjustment unit 330 may be operated in the first mode, in which pneumatic pressure is increased (S2542).

That is, in the case in which the second sensor 2020 does not sense the hydrogel dosage form even after the pneumatic pressure having the first intensity in the direction of gravity is supplied (S2520), the pneumatic pressure adjustment unit 330 may supply pneumatic pressure having second intensity, which is greater than the first intensity, in the direction of gravity to the channel 310 in order to move the dosage form.

Figure 26:
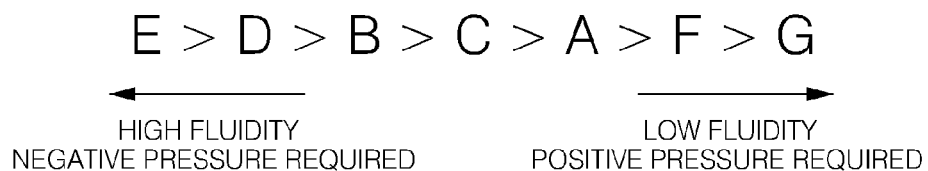

FIG. 26 illustratively shows the fluidity and required pneumatic pressure of States A to G shown in FIGS. 24 and 25. Since even the same ingredient has different fluidities due to ingredient differences and other uncontrollable factors, it is necessary to set pneumatic pressure intensity through experimental measurement and to supply pneumatic pressure having the set intensity.

Figure 27:
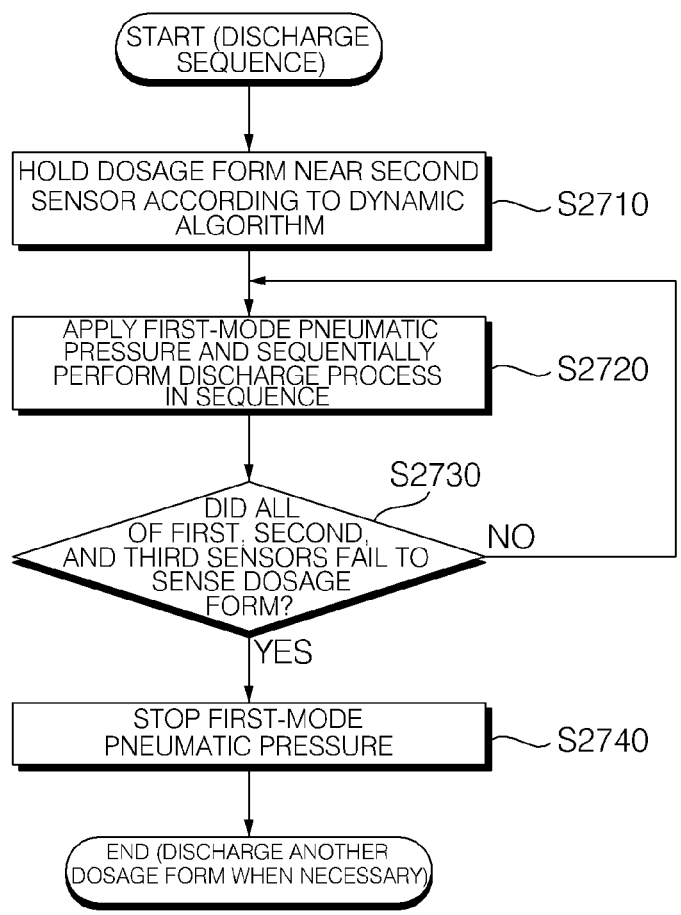

FIG. 27 is a view showing the movement algorithm of a dosage form whose turn it is to be discharged.

Referring to FIG. 27, a dosage form may be held and ready near the second sensor 2020 according to the holding algorithm described above (S2710).

Subsequently, when it is the turn of the dosage form to be discharged, the pneumatic pressure adjustment unit 330 may be operated in the first mode, and the discharge process may be performed in sequence (S2720).

In the case in which all of the first to third sensors 2010, 2020, and 2030 fail to sense the dosage form, i.e. in which it is determined that the dosage form has been discharged from the channel 310 (S2730), the pneumatic pressure adjustment unit 330 may stop the supply of pneumatic pressure (S2740).

In addition, when necessary, the above process may be equally applied to another dosage form whose turn it is to be discharged such that the dosage form is discharged.

As described above, the pneumatic pressure adjustment unit 330 may adjust the pneumatic pressure that is supplied to the channels depending on the dosage-form-discharging sequence.

In addition, the pneumatic pressure adjustment unit 330 may supply pneumatic pressure having first intensity in the direction of gravity to a channel corresponding to the dosage-form-discharging sequence, among the channels, whereby it is possible to rapidly discharge a dosage form.

Meanwhile, according to the present invention, under stable conditions in which discharge of a predetermined amount of ingredients using a predetermined level of pneumatic pressure is guaranteed, it is sufficient to adjust the movement of the dosage form merely by checking the start point and the end point of the dosage form using two sensors disposed in the channel or by determining whether the dosage form is present using a single sensor.

More preferably, however, three or more sensors may be provided so as to sense the entirety of the channel in the interest of improving the adjustment of movement of the dosage form and sensitivity in sensing errors (for example, clogging).

Consequently, three sensors may be disposed so as to sense the start point, the end point, and the movement of the dosage form, whereby it is possible to efficiently sense and manage the movement of the dosage form.

Meanwhile, hydrogen dosage forms received in a plurality of capsules may have different fluidities due to the difference in viscosity between gel dosage forms based on the difference in ingredients thereof or the difference in viscosity between gel dosage forms based on the purpose of discharge (for example, for contours or specific regions), and fluidity may be slightly changed even for the same dosage form (ingredient) for various reasons, such as a change in the storage temperature of the gel dosage forms or difficulty in heat transfer due to defective capsules.

In addition, freedom in the movement of dosage forms may be high due to force caused by the pushing structure of the capsule introduction unit 200 and fluidity realized through free dropping.

In the present invention, therefore, it is possible to dynamically control the movement of dosage forms using the directivity of positive/negative pressure using pneumatic pressure and a change in pressure intensity in terms of control in the fluidity of the dosage forms.

In addition, in the case in which dosage forms in a plurality of capsules are moved to corresponding channels, there exist dosage forms whose turn it is not to be discharged, and it is necessary to control these dosage forms at appropriate positions.

In the present invention, therefore, each dosage form may be ready at a predetermined position in a corresponding channel 310, for example, near the second sensor 2020. In the region in which the second sensor 2020 is disposed, it is possible to continuously check the viscosity (fluidity) of the dosage form through interaction between the fluidity of the dosage form and pneumatic pressure, whereby it is possible to discharge dosage forms in the discharge sequence.

Consequently, it is possible to minimize the total manufacturing time without errors such as running down and to easily mix and discharge dosage forms based on required capacity at the time of manufacture.

According to at least one of the embodiments of the present invention, it is possible to provide a hydrogel discharge device capable of discharging hydrogel to manufacture a mask pack and a method of operating the same.

In addition, according to at least one of the embodiments of the present invention, it is possible to mix various ingredients in order to manufacture a customized mask pack that is optimized for an individual.

In addition, according to at least one of the embodiments of the present invention, it is possible to conveniently and easily care for skin in a shop or at home.

In addition, according to at least one of the embodiments of the present invention, it is possible to more efficiently manufacture a mask pack through operative connection with another electronic device.

In addition, according to at least one of the embodiments of the present invention, it is possible to efficiently manage heat, the state of dosage forms, and the movement of the dosage forms in the device and to manufacture a mask pack at a faster speed.

The hydrogel discharge device according to the present invention is not limitedly applied to the constructions and methods of the embodiments as previously described; rather, all or some of the embodiments may be selectively combined to achieve various modifications.

Meanwhile, the method of operating the hydrogel discharge device according to the embodiment of the present invention may be implemented as code that can be written on a processor-readable recording medium and thus read by a processor. The processor-readable recording medium may be any type of recording device in which data is stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

The invention claimed is:

1. A hydrogel discharge device comprising:
    a capsule introduction unit, into which a plurality of capsules each containing a hydrogel dosage form is introduced;
    a dosage form transfer unit comprising a plurality of channels, along which the hydrogel dosage forms received in the capsules move;
    a dosage form spray unit configured to discharge the hydrogel dosage forms supplied from the dosage form transfer unit;
    a dosage form solidification unit configured to solidify the hydrogel dosage forms discharged from the dosage form spray unit;
    a plurality of channel sensors disposed in each of the plurality of channels; and
    a pneumatic pressure adjustment unit configured to adjust pneumatic pressure in the plurality of channels.

2. The hydrogel discharge device according to claim 1, wherein the capsule introduction unit comprises:
    introduction ports, through which the capsules are introduced;
    capsule-fastening units, in which the introduced capsules are located; and
    capsule heating units configured to heat lower parts of the capsules.

3. The hydrogel discharge device according to claim 1, wherein the dosage form spray unit comprises:
    a nozzle configured to discharge the hydrogel dosage forms supplied from the dosage form transfer unit; and
    a nozzle heating unit configured to heat the nozzle.

4. The hydrogel discharge device according to claim 1, wherein the dosage form spray unit divides a discharge surface into a plurality of regions, and sequentially discharges the hydrogel dosage forms supplied from the dosage form transfer unit to the divided regions.

5. The hydrogel discharge device according to claim 1, wherein the dosage form spray unit sequentially discharges the hydrogel dosage forms supplied from the dosage form transfer unit depending on ingredients of the hydrogel dosage forms.

6. The hydrogel discharge device according to claim 1, further comprising:
    a communication unit configured to receive skin state information from an external electronic device; and
    a processor configured to control a kind and amount of the hydrogel dosage form to be moved to the dosage form transfer unit, among the hydrogel dosage forms contained in the capsules, based on the received skin state information.

7. The hydrogel discharge device according to claim 1, wherein the dosage form solidification unit comprises:
    a discharge plate, on which the hydrogel dosage forms discharged from the dosage form spray unit are stacked; and
    a discharge plate heating unit configured to heat the hydrogel dosage forms discharged from the dosage form spray unit.

8. The hydrogel discharge device according to claim 1, further comprising an output unit configured to output at least one of information about capsules to be introduced into the capsule introduction unit or information about capsules that have been introduced into the capsule introduction unit.

9. The hydrogel discharge device according to claim 1, further comprising:
    a case, which defines an external appearance of the hydrogel discharge device, wherein
    the case is divided into an upper opaque region and a lower transparent region,
    the capsule introduction unit is disposed to correspond to the opaque region of the case,
    the dosage form solidification unit is disposed to correspond to the transparent region of the case,
    a portion of each of the dosage form transfer unit and the dosage form spray unit is disposed to correspond to the opaque region of the case, and
    a remaining portion of each of the dosage form transfer unit and the dosage form spray unit is disposed to correspond to the transparent region of the case.

10. The hydrogel discharge device according to claim 1, further comprising:
    channel heating units configured to heat the channels.

11. The hydrogel discharge device according to claim 10, further comprising a processor configured to control the pneumatic pressure adjustment unit.

12. The hydrogel discharge device according to claim 10, wherein the channel sensors comprise:
    a first sensor disposed at a capsule-introduction-unit-side inlet in the channel;
    a third sensor disposed at a dosage-form-spray-unit-side outlet in the channel; and
    a second sensor disposed between the first sensor and the third sensor.

13. The hydrogel discharge device according to claim 12, wherein the second sensor comprises an upper sensor disposed at an upper side and a lower sensor disposed at a lower side.

14. The hydrogel discharge device according to claim 12, wherein, in a case in which only the first sensor senses the hydrogel dosage form but the second sensor and the third sensor do not sense the hydrogel dosage form, the pneumatic pressure adjustment unit is configured to supply pneumatic pressure having a first intensity in a direction of gravity to the channel.

15. The hydrogel discharge device according to claim 14, wherein, in a case in which the second sensor does not sense the hydrogel dosage form even after the pneumatic pressure having the first intensity in the direction of gravity is supplied, the pneumatic pressure adjustment unit is configured to supply pneumatic pressure having a second intensity, which is greater than the first intensity, in the direction of gravity to the channel.

16. The hydrogel discharge device according to claim 12, wherein, in a case in which the first sensor and the second sensor sense the hydrogel dosage form, the third sensor does not sense the hydrogel dosage form, and holding of the hydrogel dosage form is sensed in a region corresponding to the second sensor, the pneumatic pressure adjustment unit is configured to supply no pneumatic pressure to the channel.

17. The hydrogel discharge device according to claim 12, wherein, in a case in which the first sensor, the second sensor, and the third sensor sense the hydrogel dosage form and in which the second sensor senses a downward movement of the hydrogel dosage form, the pneumatic pressure adjustment unit is configured to supply pneumatic pressure having a first intensity in a direction opposite gravity to the channel.

18. The hydrogel discharge device according to claim 17, wherein
in a case in which the second sensor senses an upward movement of the hydrogel dosage form after the pneumatic pressure having the first intensity in the direction opposite gravity is supplied, the pneumatic pressure adjustment unit is configured to repeatedly supply pneumatic pressure having a first intensity in the direction of gravity and pneumatic pressure having a first intensity in the direction opposite gravity to the channel, and
in a case in which holding of the hydrogel dosage form is sensed in a region corresponding to the second sensor after the pneumatic pressure having the first intensity in the direction opposite gravity is supplied, the pneumatic pressure adjustment unit is configured to continuously supply pneumatic pressure having a first intensity in the direction opposite gravity.

19. The hydrogel discharge device according to claim 17, wherein, in a case in which the second sensor senses a downward movement of the hydrogel dosage form after the pneumatic pressure having the first intensity in the direction opposite gravity is supplied, the pneumatic pressure adjustment unit is configured to supply pneumatic pressure having a second intensity, which is greater than the first intensity, in the direction opposite gravity.

20. The hydrogel discharge device according to claim 19, wherein
in a case in which the second sensor senses an upward movement of the hydrogel dosage form after the pneumatic pressure having the second intensity in the direction opposite gravity is supplied, the pneumatic pressure adjustment unit is configured to repeatedly supply pneumatic pressure having a second intensity in the direction opposite gravity and pneumatic pressure having a first intensity in the direction of gravity, and
in a case in which holding of the hydrogel dosage form is sensed in a region corresponding to the second sensor after the pneumatic pressure having the second intensity in the direction opposite gravity is supplied, the pneumatic pressure adjustment unit is configured to continuously supply pneumatic pressure having a second intensity in the direction opposite gravity.

* * * * *